US012809620B2

(12) United States Patent
Ishak et al.

(10) Patent No.: US 12,809,620 B2
(45) Date of Patent: Nov. 24, 2026

(54) SOFTWARE RECIPE DIFFERENCE DETECTION

(71) Applicant: Workato, Inc., Mountain View, CA (US)

(72) Inventors: Iliana Ishak, Singapore (SG); Yu Wu, Mountain View, CA (US); Nishtha Mehrotra, North Tustin, CA (US); Andrey Piskunov, Tokyo (JP); Pavel Shurygin, Tbilisi (GE); Konstantin Zhandov, Los Gatos, CA (US); Yuriy Grunin, Domodedovo (RU)

(73) Assignee: WORKATO, INC., Palo Alto, CA (US)

( * ) Notice: Subject to any disclaimer, the term of this patent is extended or adjusted under 35 U.S.C. 154(b) by 698 days.

(21) Appl. No.: 18/163,758

(22) Filed: Feb. 2, 2023

(65) Prior Publication Data

US 2023/0259357 A1 Aug. 17, 2023

Related U.S. Application Data

(60) Provisional application No. 63/267,444, filed on Feb. 2, 2022.

(51) Int. Cl.
*G06F 8/71* (2018.01)

(52) U.S. Cl.
CPC .................................... *G06F 8/71* (2013.01)

(58) Field of Classification Search
CPC ........................................................ G06F 8/71
USPC ........................................................ 717/122
See application file for complete search history.

(56) References Cited

U.S. PATENT DOCUMENTS 7,735,062 B2 * 6/2010 de Seabra e Melo .. G06F 9/451 715/229
8,170,901 B2 * 5/2012 Shukla ............... G06Q 10/0633 705/7.12
9,594,544 B2 * 3/2017 Wang ........................ G06F 8/38
(Continued)

OTHER PUBLICATIONS

Forsey, Caroline, How to Track Changes in Google Docs [FAQ], Oct. 5, 2022, retrieved on Feb. 2, 2023 from https://blog.hubspot.com/marketing/google-docs-track-changes (5 pages).
(Continued)

*Primary Examiner* — Wei Y Mui
*Assistant Examiner* — Amir Soltanzadeh
(74) *Attorney, Agent, or Firm* — VLP Law Group, LLP; Lance Topham

(57) ABSTRACT

A system may determine a first code version including a first plurality of executable steps, the first plurality of executable steps including one or more triggers and one or more actions triggered by the one or more triggers. The system may determine a second code version including a second plurality of executable steps, the second plurality of executable steps including at least one change from the first plurality of executable steps. In some implementations, the system may detect the at least one change between the first plurality of executable steps and the second plurality of executable steps. The system may generate a graphical user interface including one or more graphical elements graphically indicating the at least one change and may provide the graphical user interface for display on a client device.

18 Claims, 22 Drawing Sheets

(56) References Cited

U.S. PATENT DOCUMENTS

| | | | | |
|---|---|---|---|---|
| 2012/0159434 | A1* | 6/2012 | Dang | G06F 8/36 717/120 |
| 2015/0143345 | A1* | 5/2015 | Patton | G06F 11/34 717/131 |
| 2017/0322783 | A1* | 11/2017 | Khoyi | G06F 3/04847 |
| 2023/0093122 | A1* | 3/2023 | Pateriya | H04L 63/10 726/4 |

OTHER PUBLICATIONS

Track Changes in Word, Microsoft Support, retrieved on Feb. 2, 2023 from https://support.microsoft.com/en-us/office/track-changes-in-word-197ba630-0f5f-4a8e-9a77-3712475e806a (13 pages).

Viewing a file, GitHub Docs, retrieved on Feb. 2, 2023 from https://docs.github.com/en/repositories/working-with-files/using-files/viewing-a-file (5 pages).

* cited by examiner

1700

1800

1900

SOFTWARE RECIPE DIFFERENCE DETECTION

BACKGROUND

The present disclosure relates to detection of differences between software code, such as low-code software recipes. Some implementations also describe adaptable interfaces that distinguish between dynamic code versions, such as changes not evident in text of software code.

Detecting changes between documents is common in word processing and other applications where text in different document versions is compared and drawn out in tracked or redline changes, for example, in Microsoft Word® or Adobe Acrobat®.

Software code may be represented as textual code or graphically in a low- or no-code software recipe. For instance, programmers may create workflows with a series of executable steps, which may be conditional statements with various configurations and other features, which are update or new versions are created with revisions. Unfortunately, unlike regular text comparisons, technologies for detecting changes and comparing versions are lacking for code due to its dynamic, functional, and multi-layer nature. These difficulties are further compounded when the code is represented as a low- or no-code software recipe or routine, such as when the code is represented as a high-level or outline.

In previous attempts to detect changes between code, such as difference detection on Github™, the difference detection and display, similar to that of word processing, is limited to a text comparison, which may be highlighted or tracked in redline or similar. Unfortunately, due to the unique nature of code, especially low-code software recipes, these methods are insufficient because they fail to take into consideration functionality, hidden layers, non-functional changes, and many other issues.

Accordingly, because executable operations may visually appear the same, such as in their text or outline, while they perform differently functionally previous track changes are insufficient. Unfortunately, because the changes cannot be or are difficult to detect, changes in code is often not detected until it is executed in its application, which increases bugs and reduces computational efficiency. Accordingly, there has been a need in code or software routine programming for improved technology to remedy these and other issues. Furthermore, these issues are specific to the use and execution of code and exacerbated when multiple layers or configurations are used, so it cannot be performed in a non-technical environment.

SUMMARY

This disclosure describes technology that addresses the above-noted deficiencies of existing solutions by providing technology for detecting software recipe differences, among other improvements. The technology described herein may provide a computer-implemented method including: determining, by a processor, a first code version including a first plurality of executable steps, the first plurality of executable steps including one or more triggers and one or more actions triggered by the one or more triggers; determining, by the processor, a second code version including a second plurality of executable steps, the second plurality of executable steps including at least one change from the first plurality of executable steps; detecting, by the processor, the at least one change between the first plurality of executable steps and the second plurality of executable steps; generating, by the processor, a graphical user interface including one or more graphical elements graphically indicating the at least one change; and providing, by the processor, the graphical user interface for display on a client device.

Other implementations of one or more of these aspects or other aspects include corresponding systems, apparatus, and computer programs, configured to perform the various actions and/or store various data described in association with these aspects. These and other implementations, such as various data structures, are encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

DETAILED DESCRIPTION

Figure 1:
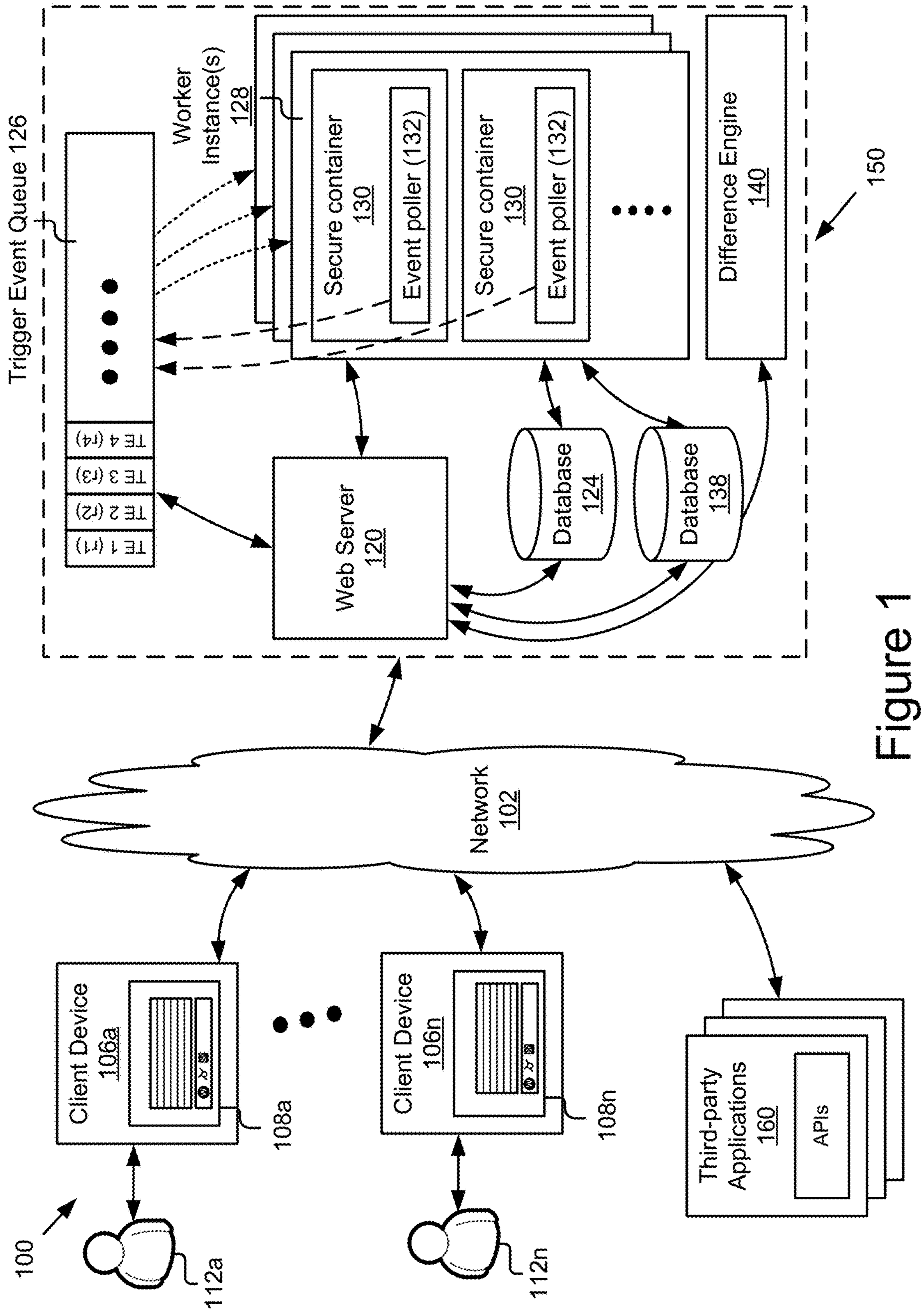
FIG. 1 is a block diagram illustrating an example software recipe management system encompassed by the technology.

The innovative technology disclosed in this application is capable of, for instance, detecting and identifying changes in programming code, such as low-code or no-code recipes, although other implementations are possible and contemplated. The technology may include various systems, methods, computer program products, interfaces, and other aspects to provide these and other advantages, acts, and/or functionality.

Depending on the implementation, the technology improves over previous attempts and provides numerous benefits, for example, over the problems described in the Background. For instance, while previous attempts at comparing changes were limited to textual changes, implementations of the technology described herein address problems specifically arising due to the multi-layered and dynamic nature of software code. Furthermore, as low- and no-code software recipes or routines are becoming increasingly, it is increasingly difficult for technology to detect and display differences because the code is defined and displayed in outline format and often in graphical fields rather than merely text. For example, the problems addressed by the technology herein are rooted in computer technology and do not have a non-computer analog because software code and steps are executable, may have hidden configurations, have connections, and certain changes may not be evident unless the code is executed. Accordingly, the technology detects and draws out changes in configuration or execution, which was not previously possible. The improvements herein provide these and other improvements especially in the context of executable code steps, which may include triggers or conditions, actions or operations, logic, and other code elements, for example, as described in further detail below.

As discussed in further detail elsewhere herein, the technologies are both technical in nature and constructed to address technical problems that arise in a technical environment. For instance, due to the functional nature and non-visible information (e.g., sub layers, configurations, connection changes, execution changes, whether a step is skipped, etc.), executable code and its steps/operations present challenges that would neither be detected, relevant, nor would it be possible in non-technical environments, such as text comparison. Furthermore, not only do the technologies reduce bugs and associated computational issues and inefficiencies from unintended code changes, the technologies described herein also improve processing and computational resource utilization. For example, the technology reduces depictions of changed configurations, interfaces, sub text, etc., which allows the code to be displayed on limited sized displays without significant scrolling or loading large amounts of data. Other technical improvements are described and evident herein.

The technology may include a cloud-based service that automates interaction between different applications, such as web applications, to facilitate data flow. For the user, the technology simplifies the logic of connecting different applications allowing the user to build integrations with applications, for example, using a drag and drop interface. Beneficially, the technology detects and identifies, for example, in graphical user interfaces, changes at various levels of code (e.g., the simplified logic), such as the insertion or deletion of words or lines of code, changes in indentation, changes that would not be evident without execution, steps being reordered, invisible changes, and/or other changes beyond what typical track changes to documents can provide. Furthermore, the technology uses innovative graphical user interfaces that quickly and easily summarize complex changes on a display with limitations in its resolution, dimensions, or other technical shortcomings.

Depending on the implementation, the technology may provide numerous improvements, which are described in further detail throughout this disclosure. For instance, among other improvements, the technology may provide a visual comparison of workflows or non-text code, may compare line changes as well as configuration changes, may generate and provide a configuration change summary in a configuration panel at the top of a workflow, may generate and provide a connection change summary drawing out changes in integrations with other services, and/or may generate and provide a workflow change summary that scrolls and/or opens an executable step's configuration. In some implementations, the technology may generate and display graphical user interfaces that include alignment of steps horizontally or vertically in the same line, graphical patterns indicating an older version's fields and steps thereby improving accessibility, a unicolor border highlighting scrolling through field changes, one or more tags on a top right or other area of the step to indicate the nature of the change(s), multiple tags indicating multiple changes, dynamically adjusting directional flowchart arrows, and/or other aspects.

With reference to the figures, reference numbers may be used to refer to example components found in any of the figures, regardless of whether those reference numbers are shown in the figure being described. Further, where a reference number includes a letter referring to one of multiple similar components (e.g., component 000*a*, 000*b*, and 000*n*), the reference number may be used without the letter to refer to one or all of the similar components.

FIG. 1 is a block diagram illustrating an example software recipe management system 100 encompassed by the technology. The illustrated example system 100 includes client devices 106*a* . . . 106*n*, a server system 150, and third-party applications 160, which are communicatively coupled via a network 102 for interaction with one another. For example, the client devices 106*a* . . . 106*n* may be respectively coupled to the network 102 and may be accessible by users 112*a* . . . 112*n* (also referred to individually and collectively as 112). The server system 150 and third-party applications 160 are also communicatively coupled to the network 102. The use of the nomenclature "a" and "n" in the reference numbers indicates that any number of those elements having that nomenclature may be included in the system 100.

The network 102 may include any number of networks and/or network types. For example, the network 102 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP)

data packets) that is routed to designated computing devices coupled to the network 102. In some implementations, the network 102 may include a combination of wired and wireless networking software and/or hardware that interconnects the computing devices of the system 100. For example, the network 102 may include packet-switching devices that route the data packets to the various computing devices based on information included in a header of the data packets.

The client devices 106*a* . . . 106*n* (also referred to individually and collectively as 106) include computing systems having data processing and communication capabilities. In some implementations, a client device 106 may include a processor (e.g., virtual, physical, etc.), a memory, a power source, a network interface, and/or other software and/or hardware components, such as a display, graphics processor, wireless transceivers, keyboard, camera, sensors, firmware, operating systems, drivers, and/or various physical connection interfaces (e.g., USB, HDMI, etc.), etc. The client devices 106*a* . . . 106*n* may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, the system 100 may include any number of client devices 106. In addition, the client devices 106*a* . . . 106*n* may be the same or different types of computing systems.

In the depicted implementation, the client devices 106*a* . . . 106*n* respectively contain instances 108*a* . . . 108*n* of a client application (also referred to individually and collectively as 108). The client application 108 may be storable in a memory (e.g., see FIG. 2) and executable by a processor (e.g., see FIG. 2) of a client device 106 to provide for user interaction, receive user input, present information to the user via a display (e.g., see FIG. 2), and send data to and receive data from the other entities of the system 100 via the network 102. Examples of various interfaces that can be rendered and presented by the client application 108 are depicted in the figures herein.

In some implementations, the client application 108 may generate and present various user interfaces to perform these acts and/or functionality, such as the example graphical user interfaces discussed elsewhere herein, which may in some cases be based at least in part on information received from local storage, the server system 150, and/or one or more of the third-party applications 160 via the network 102. In some implementations, the client application 108 is code operable in a web browser, a native application (e.g., mobile app), a combination of both, etc. Additional structure, acts, and/or functionality of the client devices 106 and the client application 108 are described in further detail elsewhere in this document.

The server system 150 and/or the third-party applications 160 may include one or more computing systems having data processing, storing, and communication capabilities. For example, these entities 150 and/or 160 may include one or more hardware servers, virtual servers, server arrays, storage devices and/or systems, etc., and/or may be centralized or distributed/cloud-based. In some implementations, these entities 150 and/or 160 may include one or more virtual servers, which operate in a host server environment and access the physical hardware of the host server including, for example, a processor, memory, storage, network interfaces, etc., via an abstraction layer (e.g., a virtual machine manager).

In the depicted implementation, the server system 150 includes a web server 120, a trigger event queue 126, databases 124 and 138, worker instances 128, and a difference engine 140. These components, and their sub-components, are coupled for electronic communication with one another, and/or the other elements of the system 100. In some instances, these components may communicate via direct electronic connections or via a public and and/or private computer network, such as the network 102.

In some implementations, a worker instance 128 represents a worker compute node and may include more than one secure container 130, as shown in FIG. 1. Each container in the worker instance 128, at a given time, may runs a software recipe, which may include a workflow or code defining executable steps. A container may add trigger events to the trigger event queue 126 and (responsive to the trigger event being triggered) receive events from the trigger event queue 126. The event poller 132 is software configured to poll for messages indicating the completion of a prior call so the secure container can proceed to the next step of the recipe (or to completion as the case may be). The server system 150 may utilize any suitable runtime environment and process queue/worker architecture, such as Heroku™.

The web server 120 includes computer logic executable by the processor 202 (see FIG. 2) to process content requests. The web server 120 may include an HTTP server, a REST (representational state transfer) service, or other suitable server type. The web server 120 may receive content requests (e.g., product search requests, HTTP requests) from client devices 106, cooperate with the other components of the server system 150 (e.g., difference engine 140, worker instances 128, trigger event queue 126, etc.) to determine the content and or trigger processing, retrieve and incorporate data from the databases 124 and 138, format the content, and provide the content to the client devices 106. In some instances, the web server 120 may format the content using a web language and provide the content to a corresponding client application 108 for processing and/or rendering to the user for display. The web server 120 may be coupled to the databases 124 and 138 to store retrieve, and/or manipulate data stored therein.

In some implementations, the components 108, 120, 128, 126, and/or 140 may include computer logic storable in the memory 206 and executable by the processor 202, and/or implemented in hardware (e.g., ASIC, FPGA, ASSP, SoC, etc.), to provide their acts and/or functionality. For example, with reference also to FIG. 2, in some implementations, the client application 108, the web server 120, the worker instances 128, the trigger event queue 126, and/or the difference engine 140, and/or their sub-modules are sets of instructions executable by the processor 202 to provide their functionality. In some implementations, these components and/or their sub-components are stored in the memory 204 of the computing system 200 and are accessible and executable by the processor 202 to provide their functionality. In any of the foregoing implementations, these components and/or their sub-components may be adapted for cooperation and communication with the processor 202 and other components of the computing system 200.

The databases 124 and 138 are information sources for storing and providing access to data. Examples of the types of data stored by the databases 124 and 128 may include user and partner account information, codes representing the recipes, requirement tables associated with the codes, input and output schemas associated with the codes and/or applications, connection definitions defining connections with one or more other services (e.g., application programming interface, login details, protocols, etc., providing communication or integration with software services, such as third-party applications 160), objects associated with the applications, codes, and/or schemas, etc., and/or any of the other data discussed herein that is received, processed, stored, or provided by the recipe management system 100. Recipes may be associated with a user's account.

The databases 124 and 138 may be included in the computing system 200 or in another computing system and/or storage system distinct from but coupled to or accessible by the computing system 200. The databases 124 and 138 can include one or more non-transitory computer-readable mediums for storing the data. In some implementations, the databases 124 and 138 may be incorporated with the memory 204 or may be distinct therefrom. In some implementations, the databases 124 and 138 may include a database management system (DBMS) operable on the computing system 200. For example, the DBMS could include a structured query language (SQL) DBMS, a NoSQL DBMS, various combinations thereof, etc. In some instances, the DBMS may store data in multi-dimensional tables comprised of rows and columns, and manipulate, i.e., insert, query, update and/or delete, rows of data using programmatic operations.

The difference engine 140 may include hardware and/or software configured to execute software, logic, and/or routines to perform various operations, such as the operations of the tasks described herein. For example, the difference engine 140 may include specifically designed hardware, such as specifically designed logic switches and/or specifically programmed software. In some implementations, the difference engine 140 may access (e.g., in a database 124 or 138) or otherwise receive code or workflows, which may include multiple versions of code, and may compare the code and generate and provide graphical elements or interfaces (e.g., in conjunction with a client application 108) illustrating the comparison and differences. For example, the difference engine 140 may perform operations and provide features described in further detail below.

The third-party applications 160*a* . . . 160*n*, as depicted, respectively expose APIs 162 for accessing the functionality and data of the third-party applications 160*a* . . . 160*n* (also referred to individually and collectively as 160). An application 160 may include hardware (e.g., a server) configured to execute software, logic, and/or routines to provide various services (consumer, business, etc.), such as video, music and multimedia hosting, distribution, and sharing; email; social networking; blogging; micro-blogging; photo management; cloud-based data storage and sharing; ERM (enterprise risk management); CRM (customer relationship management); financial services; surveys; marketing; analytics; a combination of one or more of the foregoing services; or any other service where users store, retrieve, collaborate, generate, consume, and/or share information.

In some implementations, the client application 108, the various components of the server system 150, the third-party applications 160, etc., may require users 112 to be registered to access the acts and/or functionality provided by them. For example, to access various acts and/or functionality provided by these components, the components may require a user 112 to authenticate his/her identity (e.g., by confirming a valid electronic address or other information). In some instances, these entities 108, 120, 140, 160, etc., may interact with a federated identity server (not shown) to register/authenticate users 112. Once registered, these entities may require a user 112 seeking access to authenticate by inputting credentials in an associated user interface.

The system 100 illustrated in FIG. 1 is representative of an example system for collaborative design, and it should be understood that a variety of different system environments and configurations are contemplated and are within the scope of the present disclosure. For instance, various functionality may be moved from a server to a client, or vice versa and some implementations may include additional or fewer computing systems, services, and/or networks, and may implement various functionality client or server-side. Further, various entities of the system 100 may be integrated into to a single computing device or system or additional computing devices or systems, etc.

Additional acts, structure, and/or functionality of at least the client devices 106, the server system 150, the third-party applications 160, and their constituent components are described in further detail below.

Figure 2:
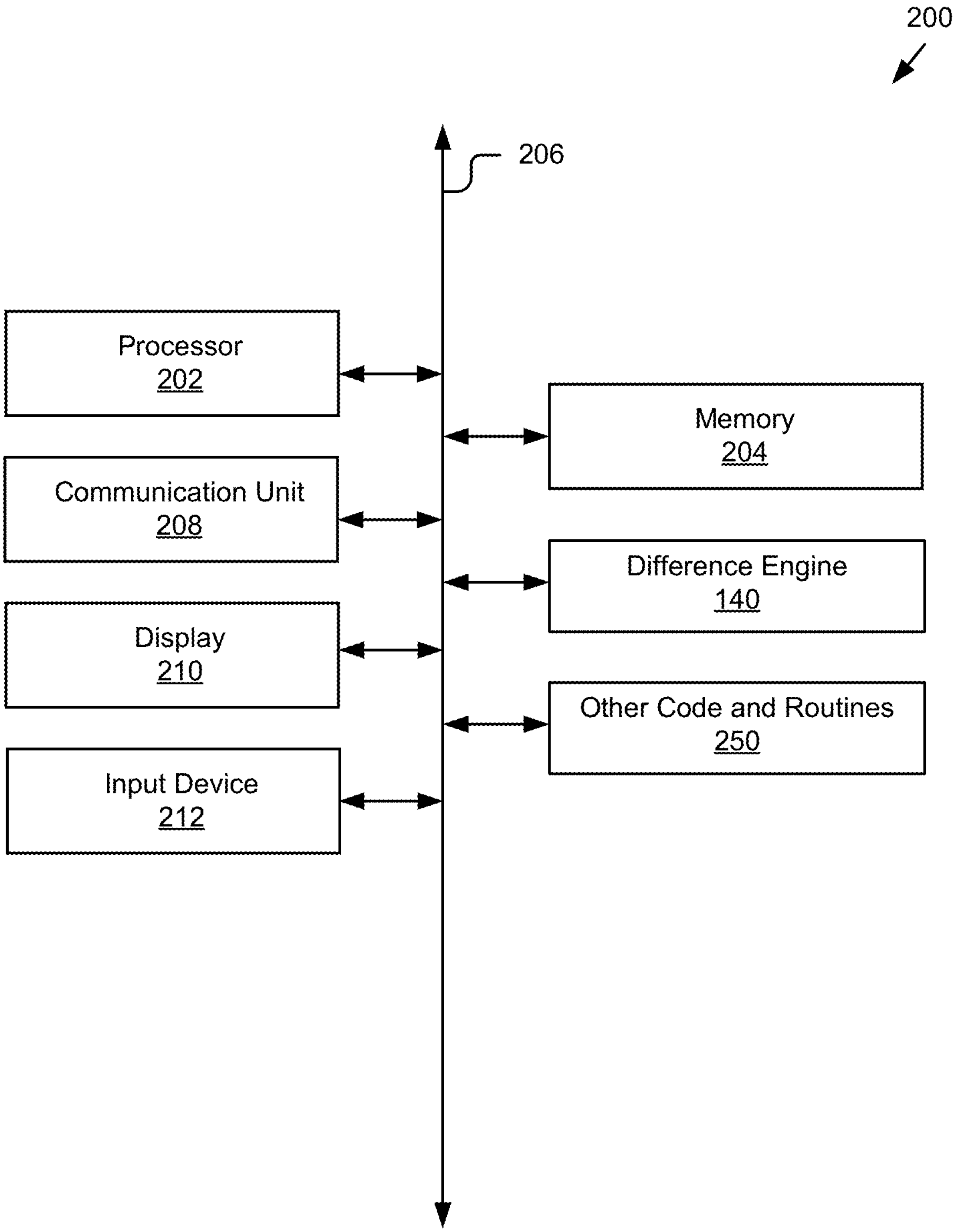
FIG. 2 is a block diagram of an example computing system.

FIG. 2 is a block diagram of an example computing system 200. The example computing system 200 may represent the computer architecture of a client device 106, a server system 150, and/or a server of the third-party application 160, depending on the implementation. As depicted, the computing system 200 may include a processor 202, a memory 204, a communication unit 208, a display 210, and an input device 212, which may be communicatively coupled by a communications bus 206. The computing system 200 depicted in FIG. 2 is provided by way of example and it should be understood that it may take other forms and include additional or fewer components without departing from the scope of the present disclosure. For instance, various components of the computing devices and may be coupled for communication using a variety of communication protocols and/or technologies including, for instance, communication buses, software communication mechanisms, computer networks, etc.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device, supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the computing system 200 including, for example, the memory 204, the communication unit 208, display 210, and the input device 212.

The memory 204 may store and provide access to data to the other components of the computing system 200. The memory 204 may be included in a single computing device or a plurality of computing devices as discussed elsewhere herein. In some implementations, the memory 204 may store instructions and/or data that may be executed by the processor 202. For example, the memory 204 may include various different combinations of the software components described herein, depending on the configuration. The memory 204 is also capable of storing other instructions and data, including, for example, an operating system, hardware drivers, other software applications, databases, etc. The memory 204 may be coupled to the bus 206 for communication with the processor 202 and the various other components of computing system 200.

The memory 204 includes a non-transitory computer-usable (e.g., readable, writeable, etc.) medium, which can be any tangible apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, ROM), a hard disk drive, an optical disk drive (CD, DVD, Blu-ray™ etc.). It should be understood that the memory 204 may be a single device or may include multiple types of devices and configurations.

The bus 206 can include a communication bus for transferring data between components of a computing system or between computing systems, a network bus system including the network 102 and/or portions thereof, a processor mesh, a combination thereof, etc. In some implementations, the various components of the system 100 may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102 and/or other computing systems. For instance, the communication unit 208 may include, but is not limited to, CAT-type interfaces; wireless transceivers for sending and receiving signals using Wi-Fi™, Bluetooth®, IrDA™, Z-Wave™, ZigBee®, cellular communications, and the like, etc.; USB interfaces; various combinations thereof; etc. The communication unit 208 may connect to and send/receive data via a mobile network, a public IP network of the network 102, a private IP network of the network 102, etc. In some implementations, the communication unit 208 can link the processor 202 to the network 102, which may in turn be coupled to other processing systems. The communication unit 208 can provide other connections to the network 102 and to other entities of the system 100 using various standard network communication protocols, including, for example, those discussed elsewhere herein.

The display 210 may display electronic images and data output by the computing system 200 for presentation to a user 112. The display 210 may include any conventional display device, monitor or screen, including, for example, an organic light-emitting diode (OLED) display, a liquid crystal display (LCD), etc. In some implementations, the display 210 may be a touch-screen display capable of receiving input from one or more fingers of a user 112. For example, the display 210 may be a capacitive touch-screen display capable of detecting and interpreting multiple points of contact with the display surface. In some implementations, the computing system 200 may include a graphics adapter (not shown) for rendering and outputting the images and data for presentation on display 210. The graphics adapter (not shown) may be a separate processing device including a separate processor and memory (not shown) or may be integrated with the processor 202 and memory 204.

The input device 212 may include any device for inputting information into the computing system 200. In some implementations, the input device 212 may include one or more peripheral devices. For example, the input device 212 may include a keyboard (e.g., a QWERTY keyboard), a pointing device (e.g., a mouse or touchpad), microphone, an image/video capture device (e.g., camera), etc. In some implementations, the input device 212 may include a touch-screen display capable of receiving input from the one or more fingers of the user. For instance, the structure and/or functionality of the input device 212 and the display 210 may be integrated, and a user of the computing system 200 may interact with the computing system 200 by contacting a surface of the display 210 using one or more fingers. In this example, the user could interact with an emulated (i.e., virtual or soft) keyboard displayed on the touch-screen display 210 by using fingers to contact the display in the keyboard regions.

A recipe may include executable steps arranged in an integration flow that contains one or more triggers and one or more sets of actions. Triggers cause actions in a recipe to be executed. Actions may be routines the recipe runs. Depending on the implementation, each action may include an input configuration and is associated with a given application. Each trigger and action further includes and input schema and an output schema. Actions may run in parallel, series, or various combinations thereof. In some instances, one action may be dependent upon the output of a preceding action. In a typical recipe configuration, the different actions in the recipe are associated with different applications, and the recipe automates the interaction between the different applications using the application programming interfaces (APIs) of those applications. For instance, the recipe may flow, sync, etc., data from one application to another, populate multiple different applications with data from a defined source application, etc. In some implementations, the recipes (codes 132) are written in Ruby, and the secure containers 130 of the worker instances 128 interpret and process the codes 132, although it should be understood that other languages and interpreters may be used.

As illustrated in the example of FIG. 2, the device 200 and/or memory 204 may include an instance and/or component of the difference engine 140, which is described in further detail elsewhere herein. Similarly, the device 200 and/or memory 204 may include other code and routines 250, which may include various logic or routines for executing other operations, such as operating systems, worker instances(s) 128, secure container(s) 130, event poller(s) 132, a web server 120, etc.

Figure 3:
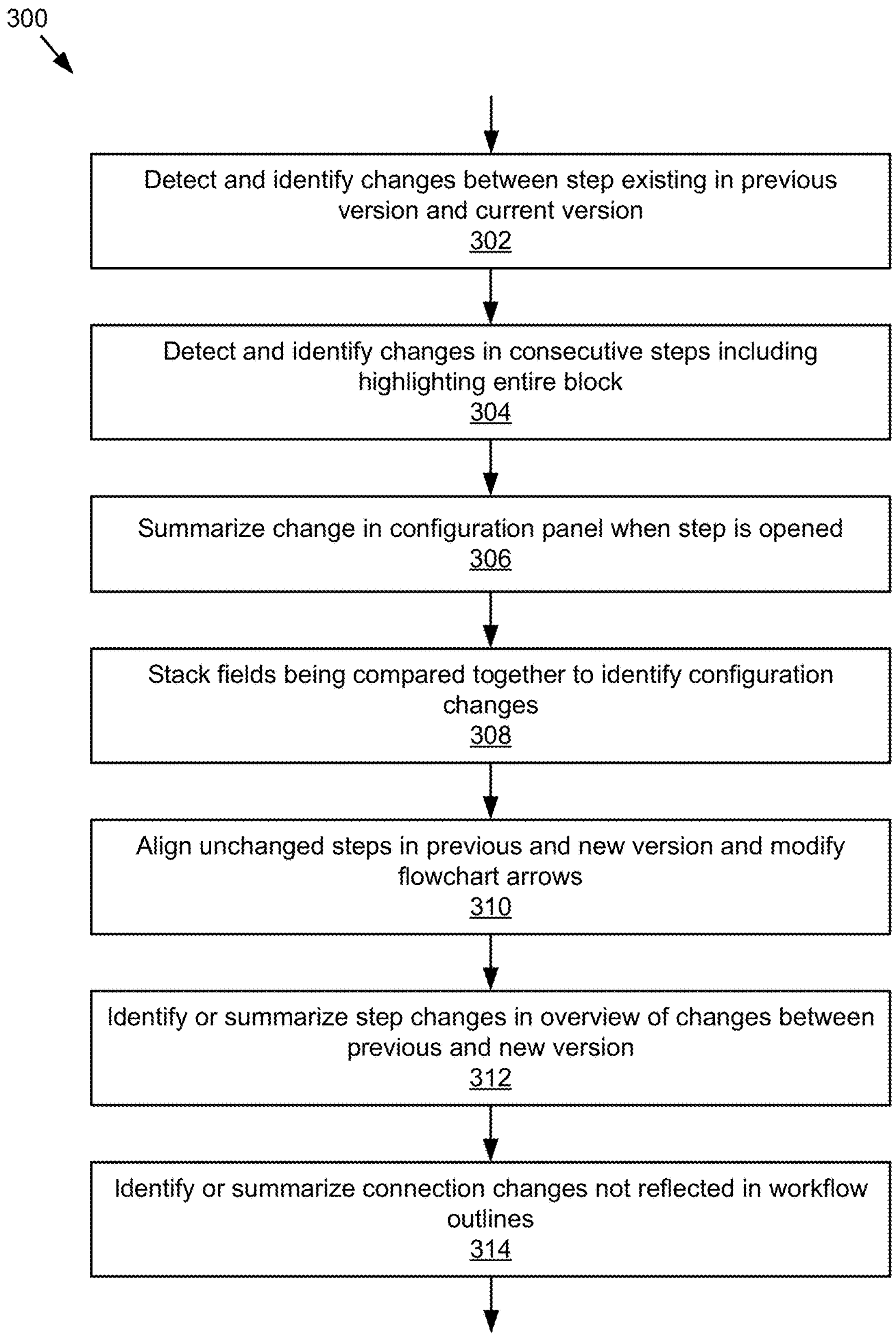
FIG. 3 is a flowchart of an example method for detecting and identifying changes in a recipe or code, for example, in low-code programming.

FIG. 3 is a flowchart of an example method 300 for detecting and identifying changes in a recipe or code, for example, in low-code or no-code programming. For example, the operations and features described herein provide improvements to detection and display in graphical user interfaces, which identify changes on two dimensional and/or limited size displays in ways that were not previously performed, as noted above.

The operations of the example method 300 may be rearranged in various orders, include additional or fewer operations, or may otherwise be modified. For example, the various features, operations, methods, and implementations described herein may be combined or exchanged. For instance, the operations of the example method 300 may be used in addition to or in place of the operations of the methods 400 and/or 500*a*-500*b*, which may provide additional details to the features and operations of the method 300.

Figure 6:
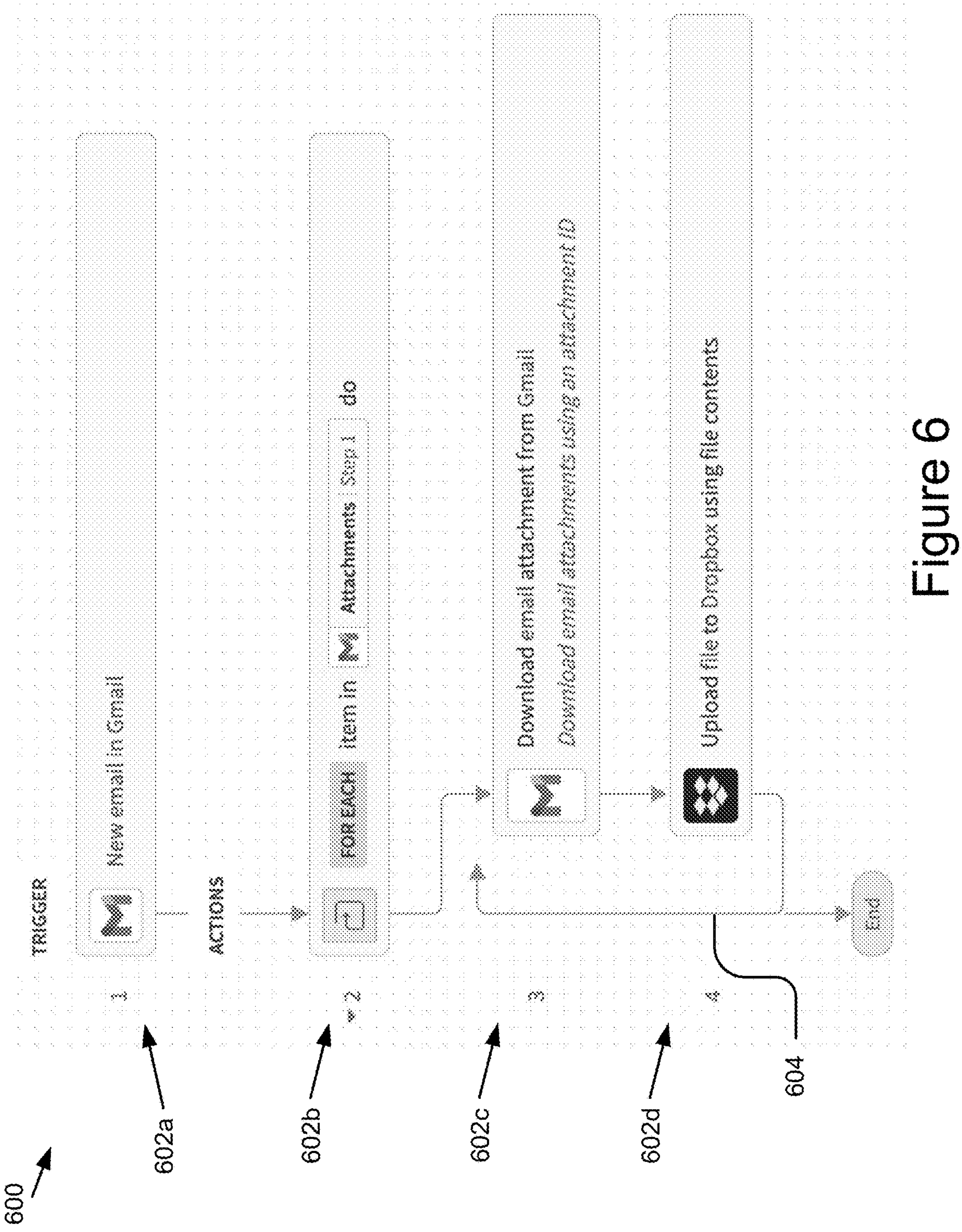
FIG. 6 illustrates an example graphical user interface depicting an example workflow or low-code software recipe.

An example workflow or low-code software recipe is illustrated in FIG. 6, which illustrates an example graphical user interface 600. As illustrated in the example of FIG. 6, a workflow may have a plurality of executable steps indicated in graphical depictions 602*a*, 602*b*, 602*c*, and 602*d*, which may reflect outlines or summaries of software code, for example, in a low-code programming environment. It should be noted that, as noted above, these graphical, low-code steps may be translated by the system 150 into executable code in various programming languages or directly.

For example, the graphical depictions 602 may be organized into a series of steps represented by graphical fields that may be configured to perform routines, such as determine conditions, receive data, transmit data, perform tests, provide integrations with software services, or otherwise, as discussed elsewhere herein. The graphical depictions may be organized vertically and/or horizontally into a series representing a sequence of executable operations/logic. In some implementations, the graphical user interface may include flowchart arrows 604 linking the graphical depictions 602 and indicating a sequence and/or logic of the steps.

For instance, the example software recipe or flow of FIG. 6 illustrates a simple code version where a new e-mail received triggers a set of actions including, for each attachment in the e-mail, downloading the attachment and uploading the files to the a cloud storage service. As illustrated, the software recipe includes conditional and recursive elements that may change based on their execution or underlying configurations. Additionally, the software recipe includes executable steps (e.g., the trigger and the action) in which the software is integrated with one or more other services. For example, a first step may include connection details/definitions via which data is automatically, continuously, or periodically retrieved or received from another software service or server, such as an e-mail server (e.g., using APIs, login credentials, etc.) or cloud storage database.

Figure 7:
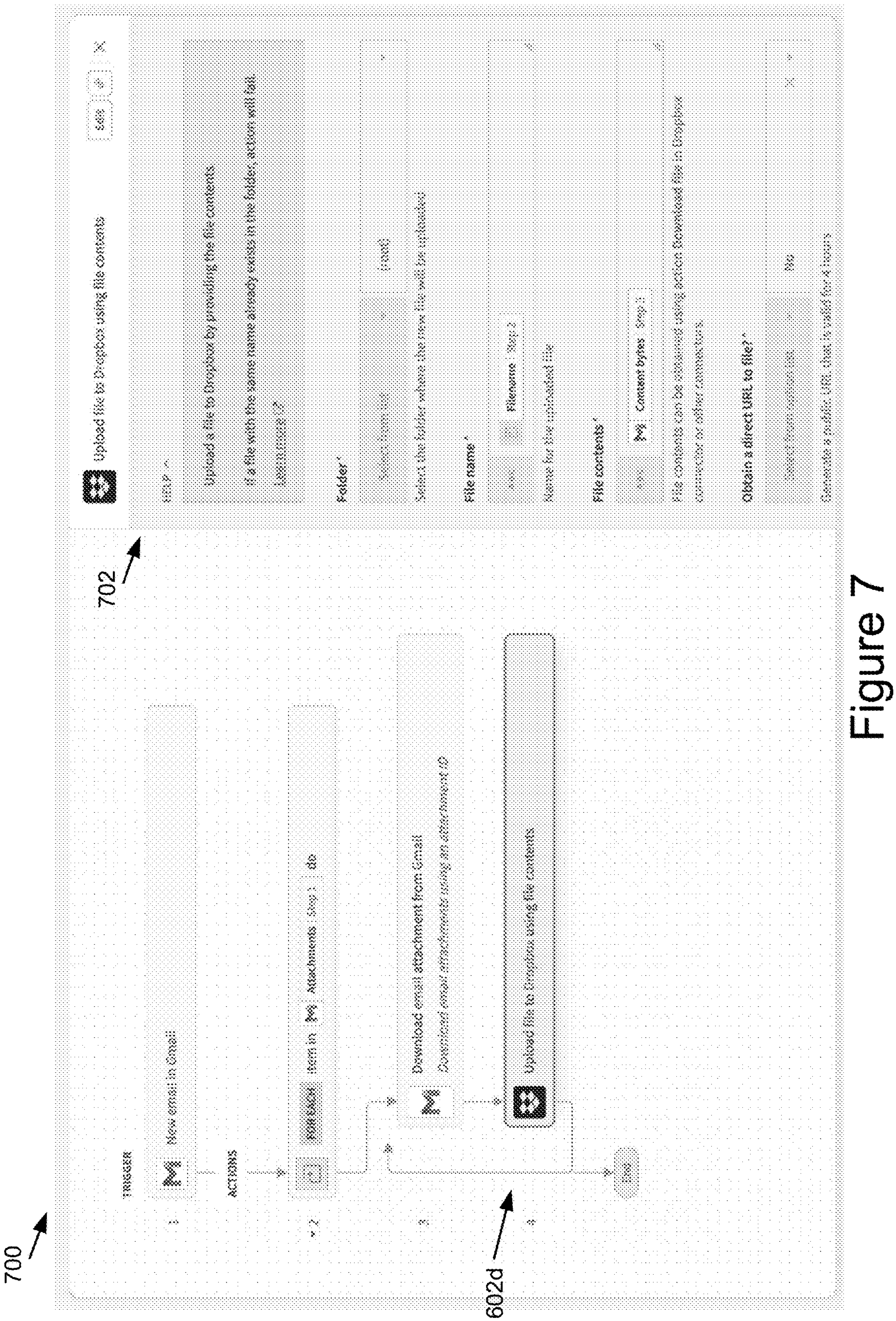
FIG. 7 illustrates an example graphical user interface for configuring executable steps.

In some implementations, the steps of software code or a software recipe may be configurable to execute defined operations. An example graphical interface 700 for configuring executable steps is illustrated in FIG. 7. For example, the configuration of a step may be hidden in the interface 600 but surfaced in the interface 700. As illustrated in the example of FIG. 7, the difference engine 140 or another application may receive input selecting a graphical depiction 602*d* of a step and, based on the selection, display a configuration panel via which the step is defined including operations, integrations, etc. For instance, as illustrated in the example, the graphical depiction 602*d* may be highlighted, outlined, displayed with shading to make it appear as if it is extending from the interface 700, colored, or otherwise modified to indicate that it is selected and being configured. A configuration panel 702 may be displayed (e.g., by displacing the graphical depictions 602 sideways, overlaying the panel 702, etc.) including data fields for displaying and/or defining the executable operations and/or connections. For instance, a step may be configured to upload or download data to a defined folder/file name, interact with a defined software service (e.g., using defined or determined APIs, URL(s), login credentials, etc.) or external computing device/server, or otherwise, as described elsewhere herein.

Returning to FIG. 3, in some implementations, at 302, the difference engine 140 may detect and identify changes between steps existing in a previous version and a current version of a recipe/code. For example, if the difference engine 140 determines that a step exists in the previous version and that it has been changed in the new version, it may highlight or perform other operations to identify the changes, such as modify a background of the new and/or old step, provide a tag or graphical flag on the step indicating a type of change between versions, or otherwise.

For example, when a software recipe is modified and/or saved, a new version may be created. As noted above, the executable nature of software recipe where executions, configurations, connections, etc., may change without being visible in the text, especially in low-code contexts results in issues in calling out changes.

As noted below, the difference engine 140 may match identical or corresponding, changed steps across versions, for example, the difference engine 140 may compare individual steps based on identification codes, configuration, and/or context (e.g., ordering, surrounding steps, triggers, or actions) to determine matching steps across versions whether changed or unchanged. For example, when a configuration of a step is changed or a new step is added (or removed) from a flow, the difference engine 140 may automatically determine that that step is changed verses the previous version. As noted below, other processing, such as execution of operations (either in operation or in a sandbox, safe, or test environment) may be performed to detect changes.

As described throughout this disclosure, the difference engine 140 may also identify various modifications, changes, or other differences (e.g., where a difference occurred in a part of the screen or interface that is not currently visible to the user, such as in a scrolled area and/or a configuration of a step, etc.) in graphical user interfaces, such as by highlighting, providing tags on graphical depictions of steps, or otherwise in visible parts of the interface(s), as described in further detail throughout this disclosure. Example changes how their graphical identifications are illustrated throughout the figures and description herein. Furthermore, because multiple or varied types of changes may be present in executable code, the difference engine 140 may indicate the nature or types of changes.

For example, the difference engine 140 may determine the nature of a change and display one or more graphical flags or tags on a graphical depiction or field of the step in order to identify its nature. Accordingly, for example, changes in configuration can be identified separately from changes in sequence.

Figure 10:
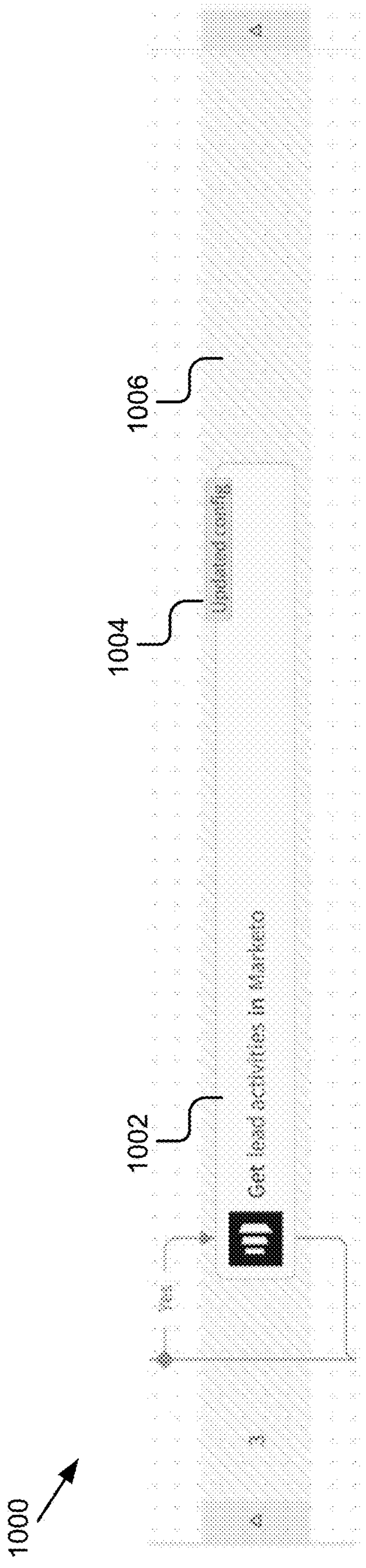
FIG. 10 illustrates an example graphical user interface in which a tag is displayed on a graphical field of a step.

FIGS. 10-14B illustrate example interfaces for tags and their example implementations. For example, FIG. 10 illustrates an example interface 1000 in which a step is displayed represented in a graphical field 1002 and the difference engine 140 has identified and generated a tag 1004 overlaid over a portion of the field 1002 to indicate a nature of a change relative to the step. For instance, the example tag indicates "updated config" to show that even though the step is displayed in the same position, the internal configuration of the step has been updated. In some implementations, the background 1006 surrounding the step or field 1002 may be highlighted, as shown in blue cross-hatching in the background of the step. As discussed elsewhere herein, other configurations are possible, such as varying flag (also referred to as tag) appearance based on a type of change, varying pattern or color of background based on the type of change, etc. For instance, as illustrated in the figures herein, a blue background with a first pattern may indicate a configuration change for a step, a green background with a second pattern may indicate a new step, and a red background with a third pattern may indicate a removed step. Where a step is removed or missing from the version of the code being displayed, the field 1002 may be omitted by the difference engine 140 and the background may be displayed to indicate that the change has been detected.

In some implementations, as illustrated in the field 1002, step definitions may be illustrated in contrasting colors to indicate connections, operations, or other details. In some instances, the contrasting color may indicate which portions of the step have been changed. In some instances, the contrasting text may indicate selectable elements that may receive input and cause the system 150 or difference engine 140 to display a configuration panel or other interface allowing the configuration and/or its changes to be viewed and/or modified.

Figure 11:
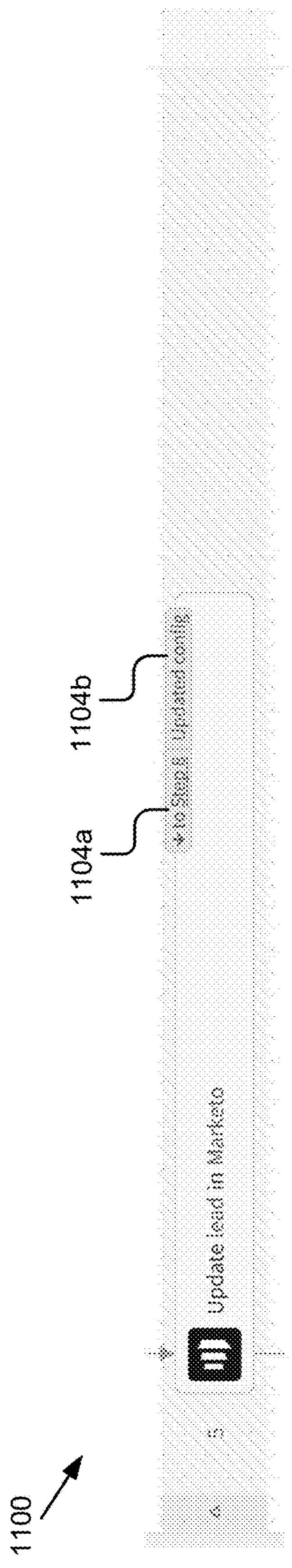
FIG. 11 illustrates an example graphical user interface in which multiple tags are generated by the difference engine to indicate multiple changes to an executable step.

FIG. 11 illustrates an example graphical interface 1100 in which multiple tags 1104*a* and 1104*b* are generated by the difference engine 140 to indicate multiple changes to a step. The tags may be presented as multiple tags or as a multiple part tag. For example, the tag(s) can say [↓ to Step {#}|Updated Config] to show that the position has changed, in which arrow direction of the tag indicates that the position of this step changed, what is the step location in the new configuration (e.g., with the new step number being a clickable link that redirects people to the new location) and/or that its internal configuration has been updated.

Figure 12:
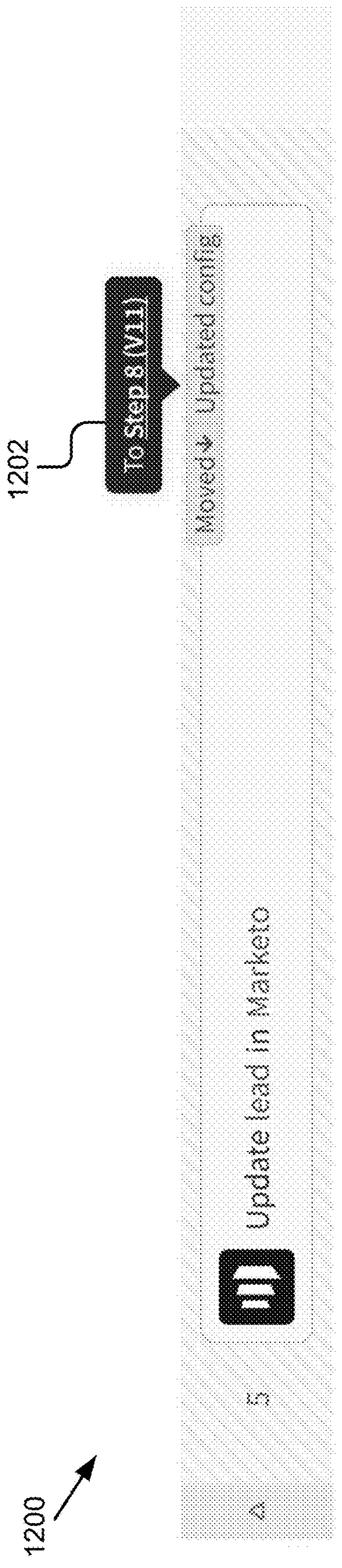
FIG. 12 illustrates an example graphical user interface in which a graphical element is overlayed over or adjacent to a tag to indicate additional information respective to the tag and or provide interaction therewith.

FIG. 12 illustrates an example graphical interface 1200 in which a graphical element 1202 is overlayed over or adjacent to a tag, for example, when the tag is selected or hovered over, the difference engine 140 may display a graphical element that indicates additional information respective to the tag and or provide interaction. For instance, the graphical element 1202 may indicate a position of the corresponding change in code. Selecting (e.g., clicking on) the element 1202 may cause the difference engine 140 to redirect the interface to the location of the moved step in the new code version.

Figure 13:
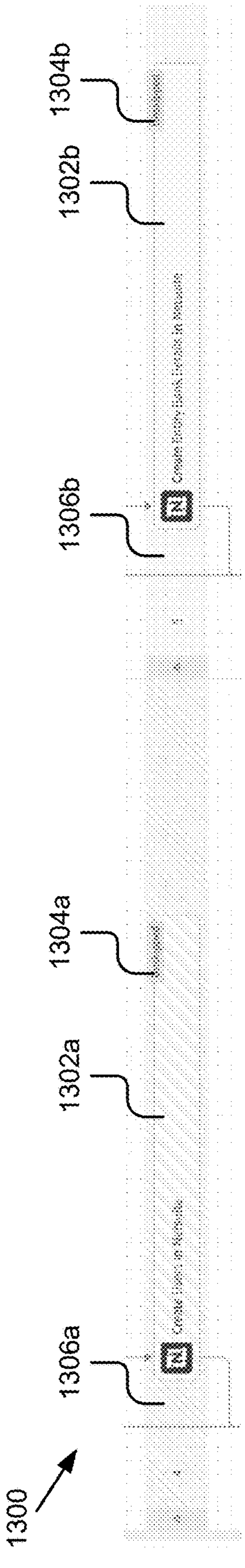
FIG. 13 illustrates an example graphical user interface in which graphical depictions of matching steps in the first and second code versions are displayed horizontally next to each other.

FIG. 13 illustrates an example graphical interface 1300 in which graphical depictions of matching steps in the first and second code versions are displayed horizontally next to each other. The example illustrates the same step in each version but the tags 1304*a* and 1304*b* may indicate whether the step is skipped, unskipped, or changed. Similarly, the fields 1302*a* and 1302*b* may be updated or modified (e.g., a background color, pattern, or border thereof) to indicate a function and/or change of the steps.

As illustrated, backgrounds 1306*a* and 1306*b* and tags 1304*a* and 1304*b* for corresponding steps may match each other in color and other appearance. For instance, backgrounds 1306*a* and 1306*b* are displayed in blue to indicate a change over the same step. In some implementations, the background 1306*a* may be different, for example, in pattern, from the background 1306*b* to indicate which version is old or new. These changes further improve accessibility and viewability of the changes.

Figure 14A:
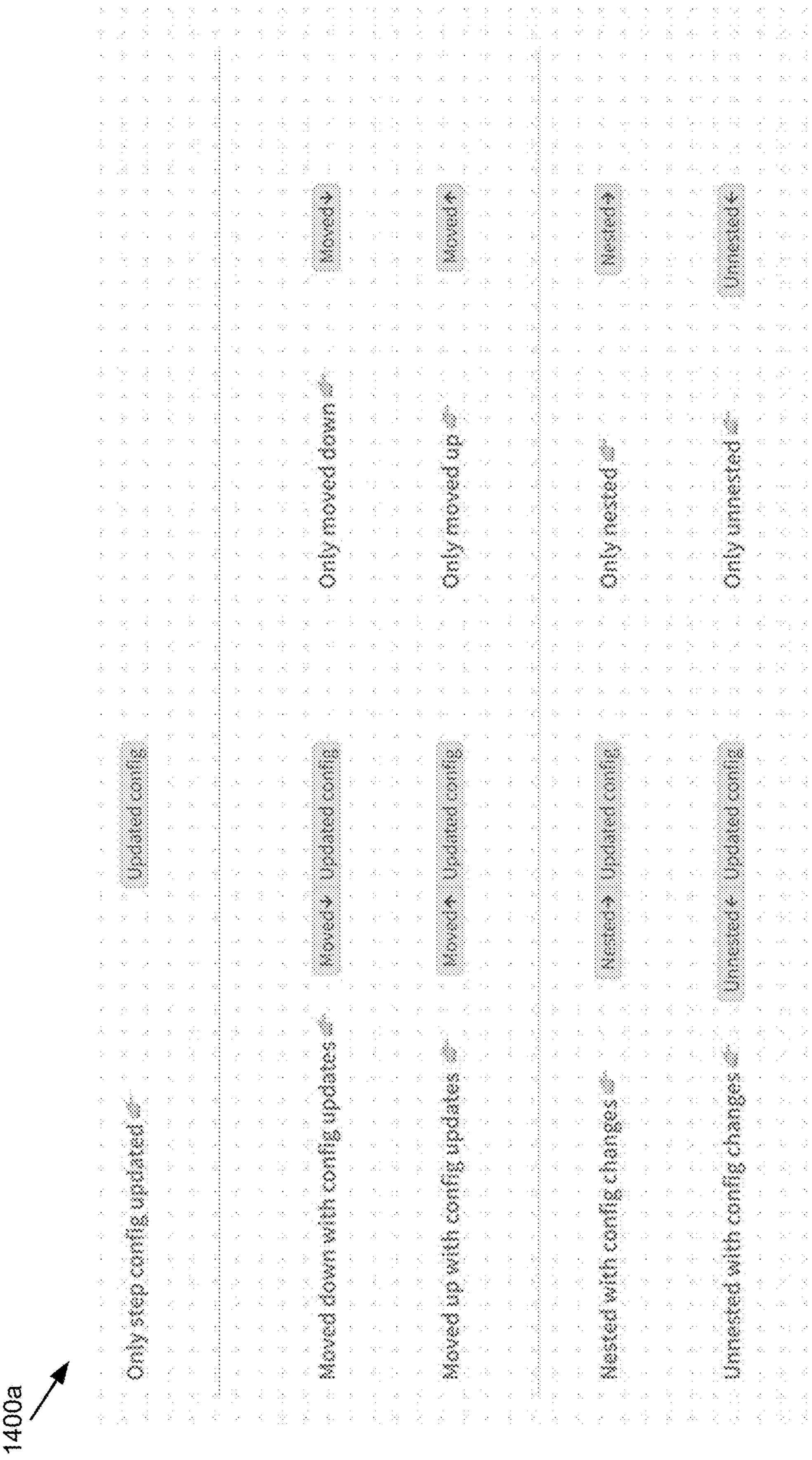
FIGS. 14A and 14B illustrate example graphical user interfaces in which various example permutations of graphical tags are shown.
Figure 14B:
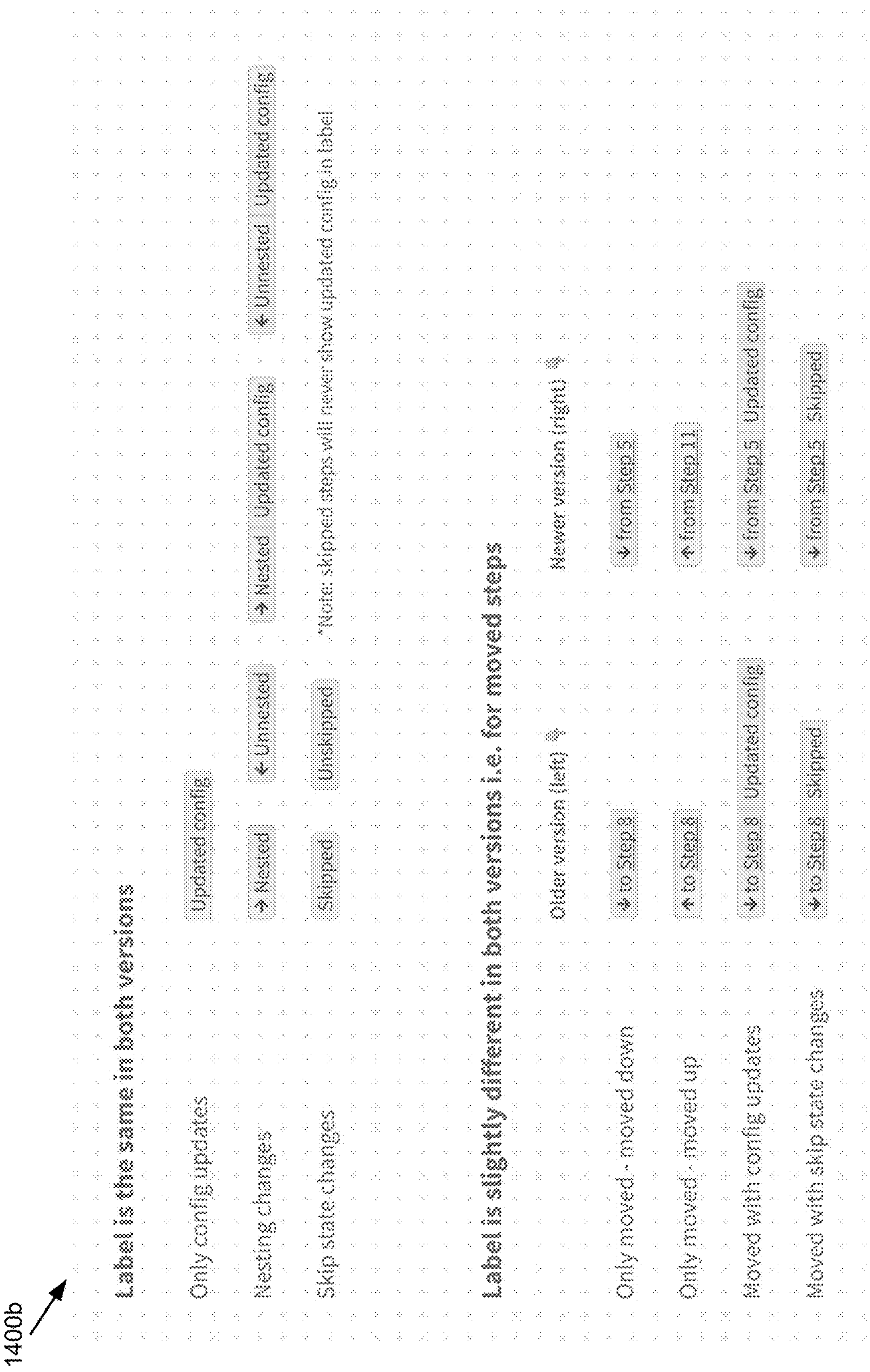

FIGS. 14A and 14B illustrate graphical interfaces 1400*a* and 1400*b* respectively in which various example permutations of graphical tag(s) are shown. The various graphical tags correspond to types of changes detected in code and, although certain examples are provided, others are possible and contemplated herein. As noted herein, the difference engine 140 may detect a type of change (e.g., a change in a configuration, an added/removed step, a moved step, etc.). The example tags may indicate an updated configuration, a moved step, a step moved up in the sequence of steps, a step moved down, a step nested in another step, a step unnested, etc., or combinations thereof. Furthermore, as illustrated in the example of FIG. 14B, some labels or tags may be the same in both versions of a step, or some labels or tags maybe different between the two versions. For instance, where steps are moved or skipped/unskipped, etc., the difference engine 140 may display tags that are different from each other (e.g., where one tag indicates moved up while the opposing, corresponding tag indicates moved down).

Figure 15:
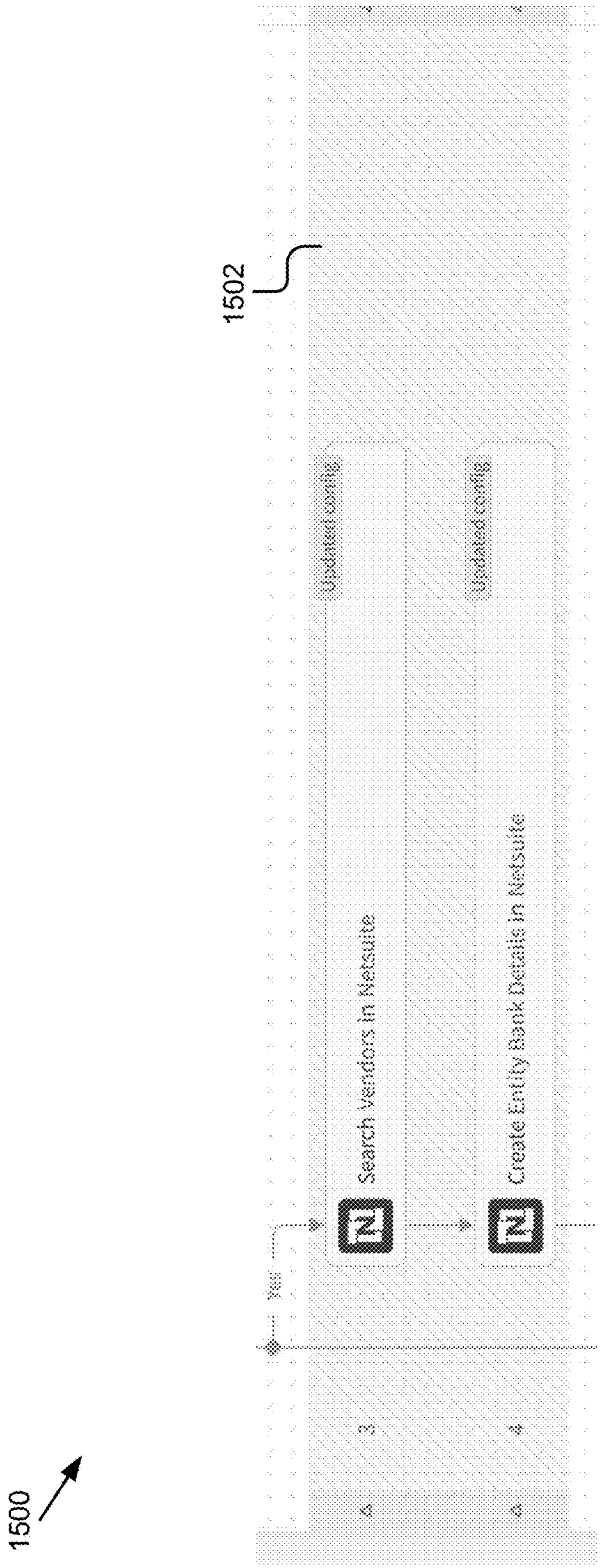
FIG. 15 illustrates an example graphical user interface in which background graphics variations are used to indicate various code changes.

Returning to FIG. 3, in some implementations, at 304, the difference engine 140 may detect and identify changes in consecutive steps including highlighting an entire block on a graphical interface. For example, if there are changes in consecutive steps, the difference engine 140 may highlight (or outline, pattern, etc.) an entire block instead of or in addition to individual lines/steps. For example, the difference engine 140 may generate an example graphical user interface 1500 illustrated in FIG. 15 in which highlighting, background pattern (e.g., shown at 1502), outlining, or another graphics extend around multiple steps thereby reducing cognitive load for blocks of changes.

In some implementations, at 306, the difference engine 140 may summarize or otherwise indicate changes in a configuration panel when a step is opened in a graphical user interface. For example, when a step is opened or selected, in addition to or alternative to generating a configuration panel indicating step changes, the difference engine 140 may generate a summary of changes for a step, set of steps, entire workflow, page, etc., which allows the changes to be scanned through quickly without having to load and/or scroll through all steps, configuration panels, connections, configuration details, or otherwise. In some instances, selection of an element of the summary may cause the difference engine 140 to load, automatically scroll, or otherwise redirect the graphical interface to the location of the change in the previous and/or new version of the code.

Figure 16A:
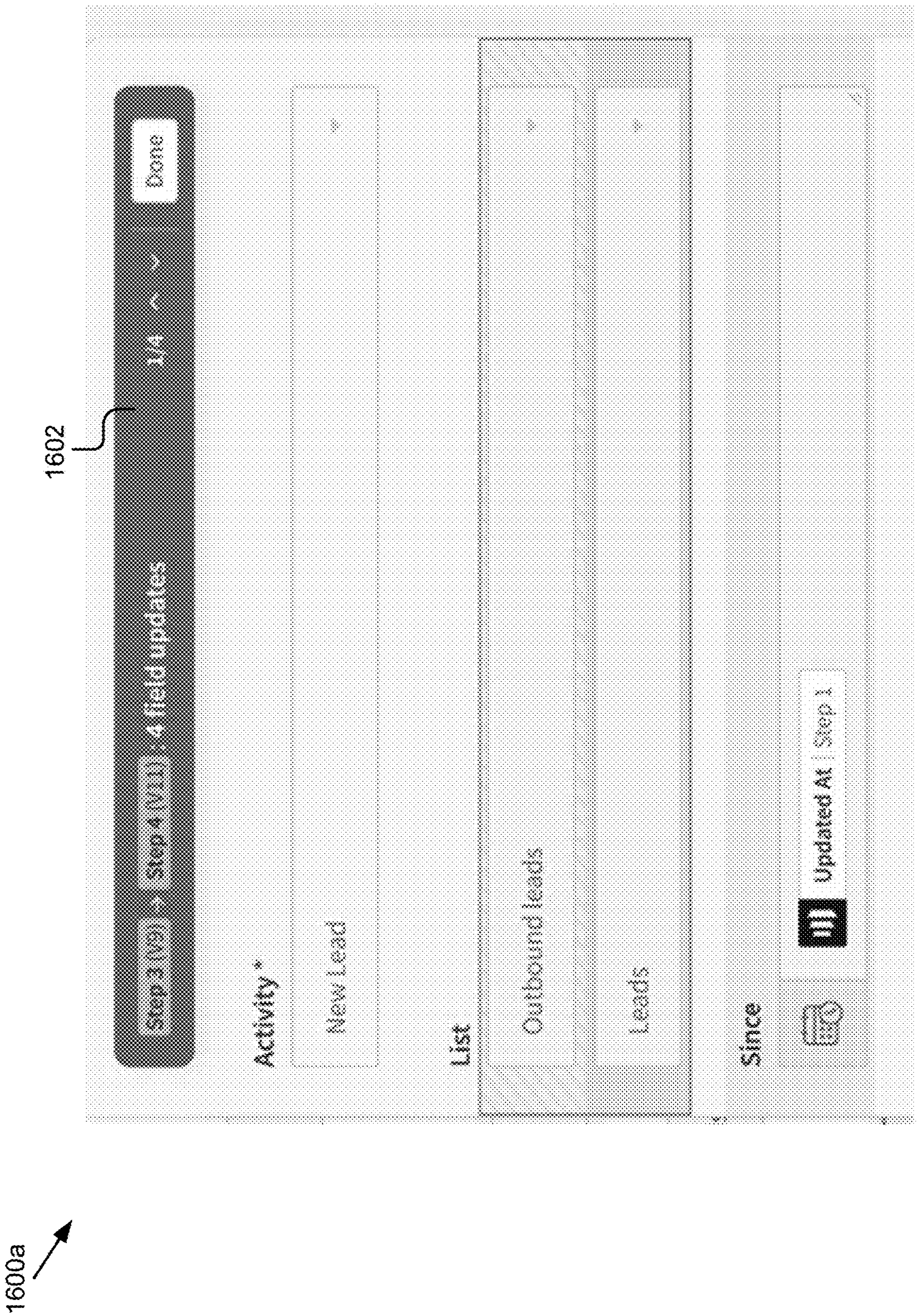
FIGS. 16A and 16B illustrate example graphical user interfaces depicting a summary of step changes.
Figure 16B:
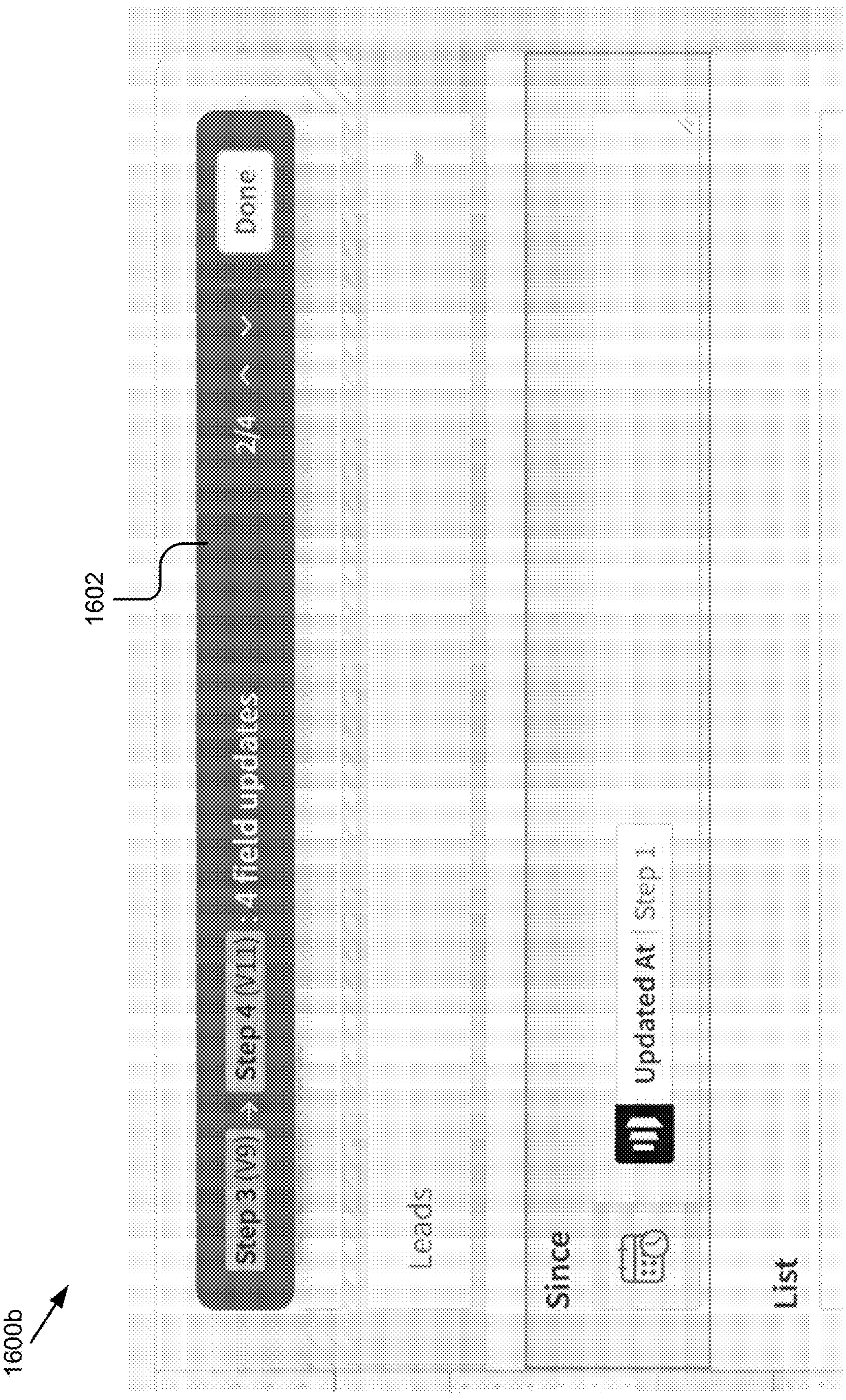

FIGS. 16A and 16B illustrate example graphical user interfaces 1600*a* and 1600*b* respectively in which the difference engine 140 has generated a summary of changes. For instance, the summary may be generated of configuration changes for a step and displayed in a configuration panel for the step. For example, FIG. 16A illustrates a graphical top bar 1602 that summarizes configuration changes and provides a way to quickly navigate through them. In the illustrated example of 16A, a list field may be highlighted with the updated blue border to further draw attention to it in a complex interface. Similarly, FIG. 16B illustrates that the top bar 1602 may be scrolled or flipped through to view or select next fields or changes. For instance, the difference engine 140 may receive input indicating to show a next summarized change and may update the graphical summary to indicate the next change.

Figure 17:
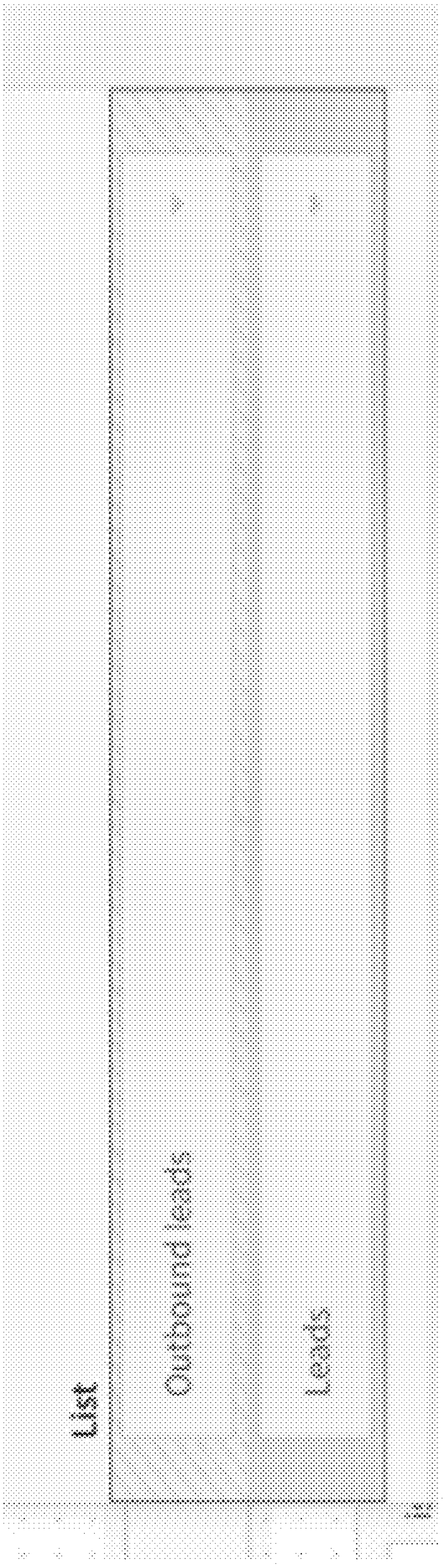
FIG. 17 illustrates an example graphical user interface in which a patterned background varies based on context.

Returning to FIG. 3, in some implementations, at 308, the difference engine 140 may stack fields being compared together to identify configuration changes in a clearly visible manner. In some instances, in order to compare actual configuration changes, the difference engine 140 may stack graphical depictions/elements together in a graphical interface. FIG. 17 illustrates an example graphical user interface 1700 in which a patterned background changes in a list of field changes to indicate and differentiate which field belongs to the old version and which field belongs to the new code version. For example, while color may indicate which type of change is made, pattern may indicate which version is shown, which may also tie the corresponding field with the visualization seen in the outline of the software recipe.

In some implementations, at 310, the difference engine 140 may align unchanged steps in a previous and new version and modify flowchart arrows to clearly illustrate similarities and changes in a graphical user interface. For example, the difference engine 140 may determine that a step in the first code version corresponds to a step in the second code version and may determine that no change is made between the two versions for that step. In some implementations, the difference engine 140 may generate the graphical list of steps so that the unchanged matching steps are displayed next to (e.g., horizontally) each other, for example, aligned in the graphical user interface.

Figure 18:
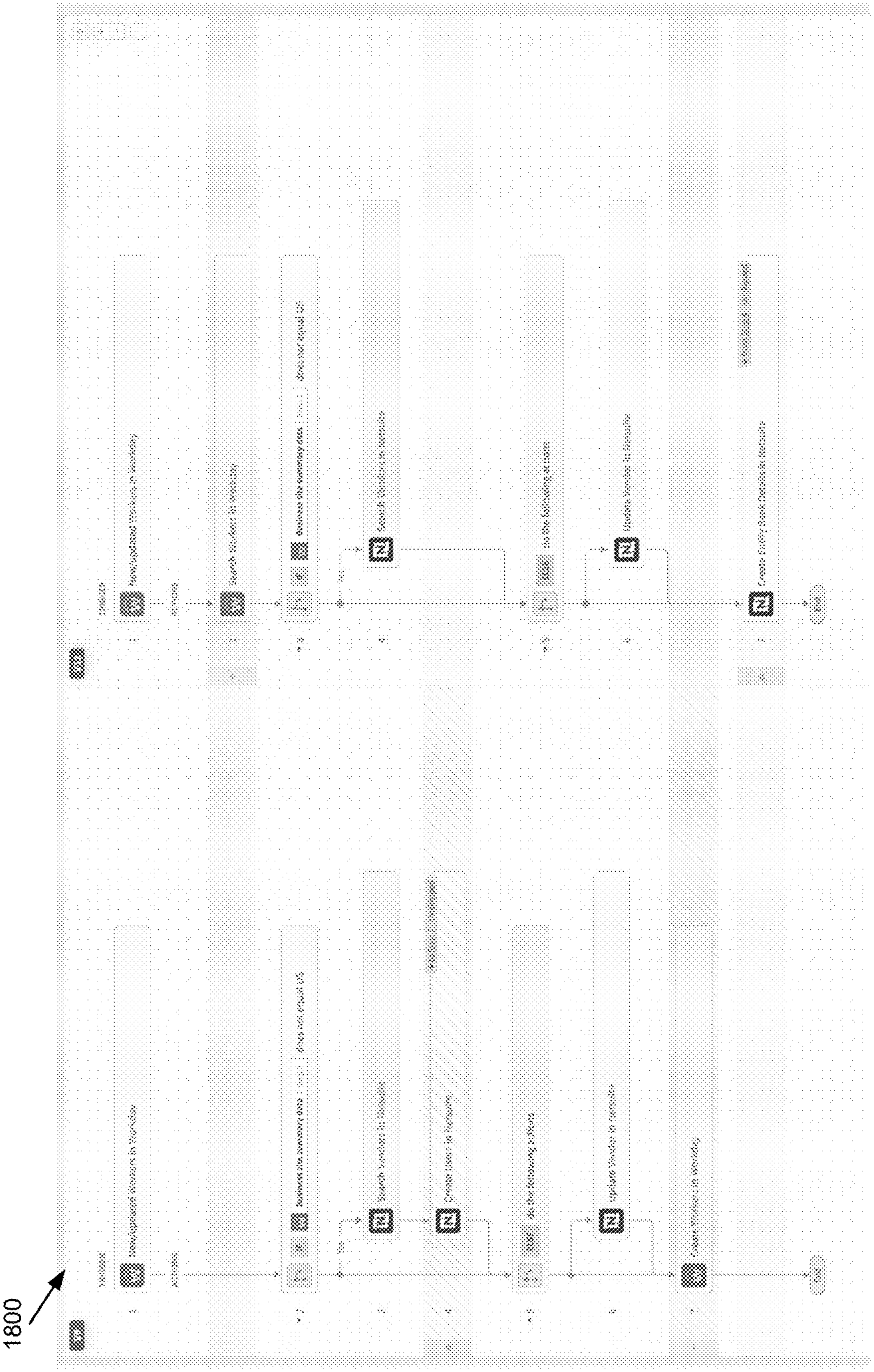
FIGS. 18 and 19 illustrate example graphical user interfaces in which a first code version is displayed in a series of previous steps on the left and a second code version is displayed in a series of current steps on the right.

FIG. 18 illustrates an example graphical user interface 1800 in which a first code version is displayed in a series of previous steps on the left and a second code version is displayed in a series of current steps on the right. Furthermore, the example interface 1800 illustrates that the difference engine 140 may automatically update flowchart arrows to make changes appear natural and improve cognition. In some implementations, where added, removed, matched changed, or matched unchanged steps vary the length, number, sequence, or logic of steps between the first version and the second code version, the difference engine 140 may automatically modify flowchart arrows to follow the proper sequence and/or bridge gaps (e.g., by elongating the arrows/lines).

Figure 19:
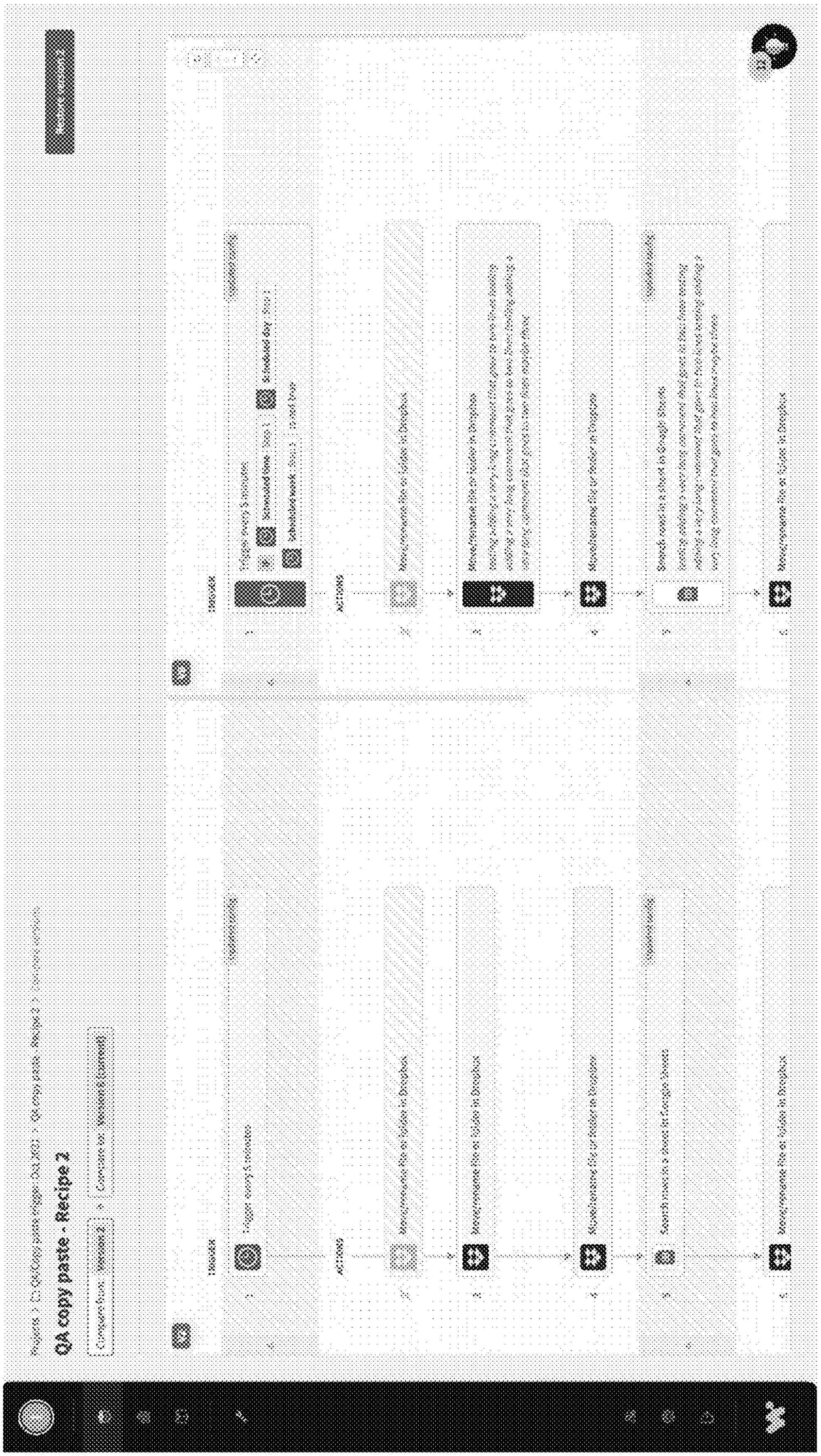

FIG. 19 illustrates an example graphical user interface 1900 in which a first code version (e.g., version 2) is displayed across from a second code version (e.g., version 6). As illustrated in the example, matching steps are aligned horizontally, changed versions are highlighted in block backgrounds, tags are displayed over changed fields (e.g., updated configuration), and other revisions are shown. For instance, because steps may occupy different heights due to name, configuration, or comment, the difference engine 140 may automatically adapt spacing. Accordingly, the difference engine 140 may automatically detect, identify, and distinguish functional changes from non-functional changes (e.g., where the difference engine 140 ignores a comment on a step). This implementation is also distinguished from some previous technologies where textual comparisons may flag comments, blank lines, or non-functional change thereby increasing graphical interface clutter and, in turn, decreasing computational efficiency.

Figure 20:
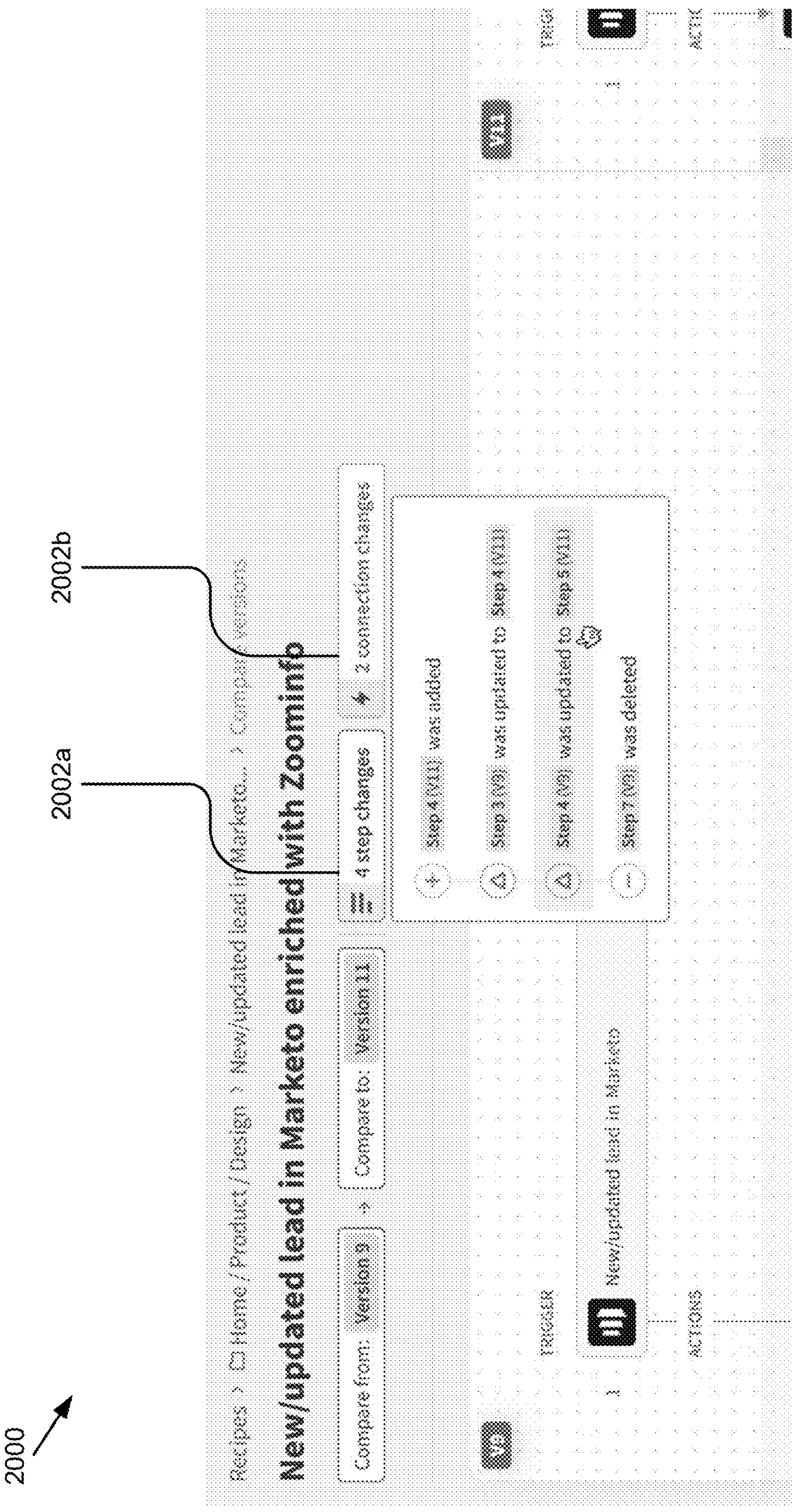
FIGS. 20 and 21 illustrate example graphical user interfaces in which summaries of code changes are displayed.

Returning to FIG. 3, in some implementations, at 312, the difference engine 140 may summarize or otherwise identify step changes in an overview of changes between a previous and a new version of the recipe or code, for example, to display where step-level changes have occurred. In some instances, the difference engine 140 may generate a summary of the total changes between versions, for example, where step changes are summarized in graphical summary. For example, as illustrated in the example graphical user interface 2000 illustrated in FIG. 20, a set of graphical elements 2002*a* and 2002*b* may be generated and displayed at the top of a graphical interface in which graphical depictions of executable steps are rendered. Each graphical element 2002*a* and 2002*b* may indicate a type and/or quantity of changes.

In some implementations, summary graphical element 2002*a* may be selected, for example, and, in response, the difference engine 140 may display a list dropdown of changes corresponding to that summary element 2002*a*. The difference engine 140 may receive, via a list and/or summary element 2002, an input selecting a specific change and, responsive to the input, automatically display a configuration panel, automatically scroll the interface to the corresponding step, or otherwise display additional information respective to the change. In some implementations, the color and/or symbols of list elements may correspond to their detected type, as illustrated, which improves speed of recognition and improves accessibility.

By displaying the summary and, based on interaction with the summary, displaying the corresponding configuration panel, tag, or change, the difference engine 140 may reduce generated or rendered interfaces, retrieved data, or other processing, which improves speed, reliability, and decreases consumed bandwidth and computational resources. It should be noted that other benefits of this and other features are possible and contemplated herein.

Returning to FIG. 3, in some implementations, at 314, the difference engine 140 may summarize or otherwise identify connection changes which may not be reflected in the workflow outlines, which these changes may be displayed in a clear manner in the graphical user interface. For example, in addition to or alternative from step, outline, or flow level changes, there may be changes to connections/connection definitions with other applications, engines, services, servers, or computing devices. For example, if a programmer selects a different user account for a connection to a third-party service in a step, the difference engine 140 may detect the change in configuration and display indications of the connection change.

Connection, configuration, and/or other execution changes may be displayed by the difference engine 140 in tags on steps, highlighting, patterns, block outline, or other graphical elements, as described elsewhere herein.

Figure 21:
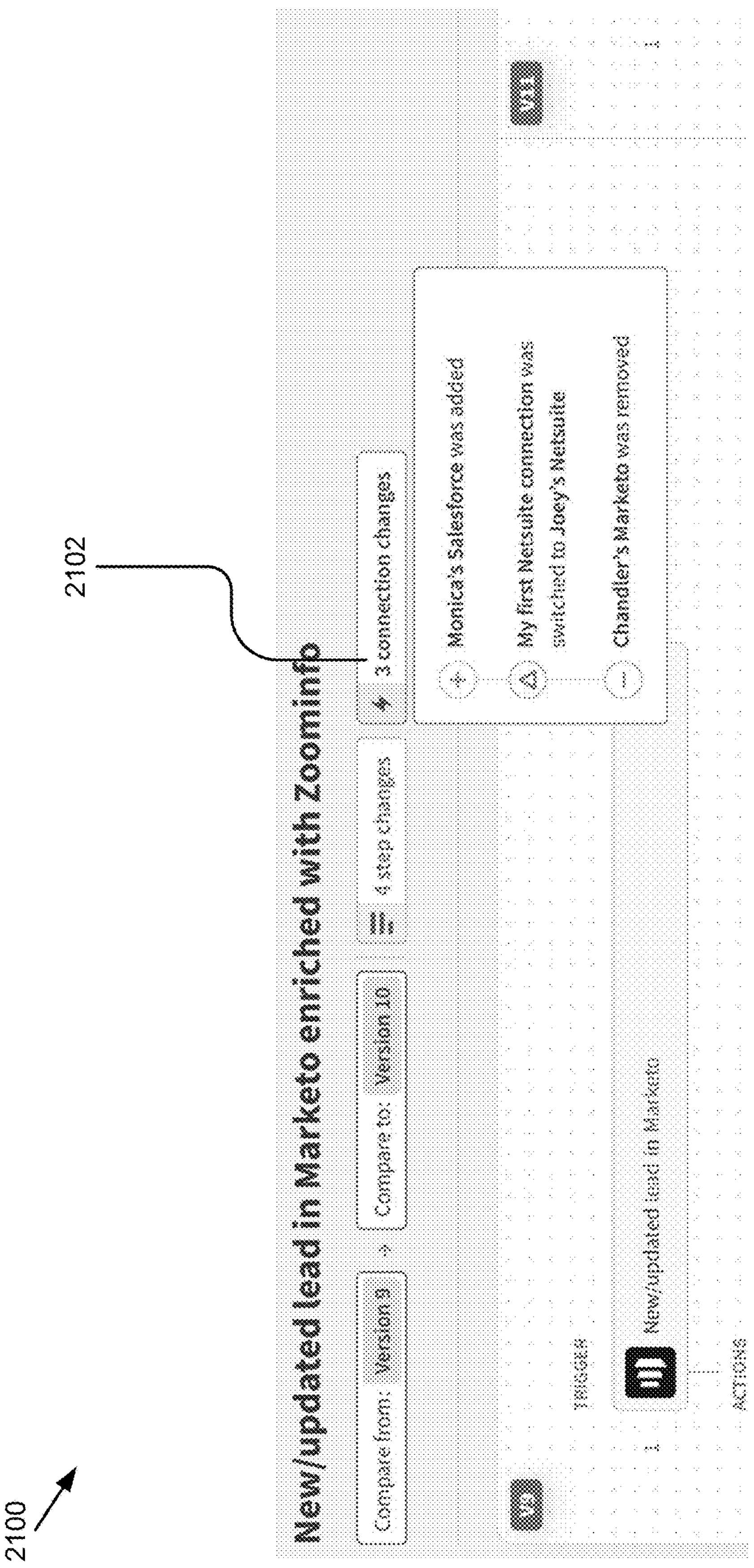

FIG. 21 illustrates an example graphical user interface 2100 depicting example connection changes using a button and dropdown. For instance, a summary graphical element 2102 may be selected and, responsive, the difference engine 140 may display a summary of connection changes in a dropdown element. Although the connection changes are illustrated in the summary, they may additionally or alternatively be displayed in a configuration panel, configuration panel summary or top bar, tags, or otherwise.

Figure 4:
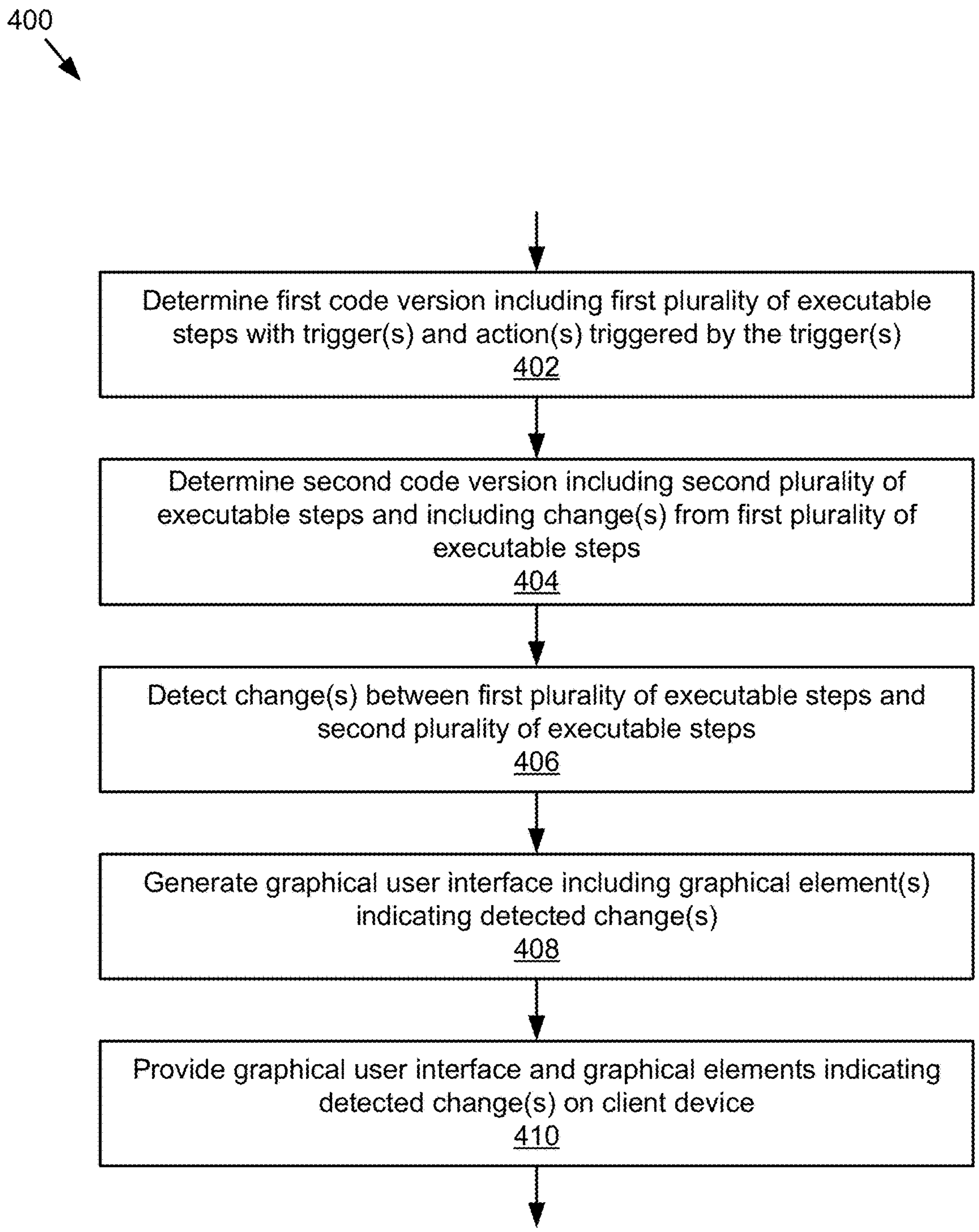
FIG. 4 is an example method for software recipe difference detection and illustration.

FIG. 4 is an example method 400 for software recipe difference detection and illustration. The operations and features described in reference to the method 400 may provide additional or alternative features or details to those described elsewhere herein or may use the other features. For example, the operations of the method 400 may use features described above in reference to FIG. 3.

In some implementations, a software recipe or workflow may be displayed in an outline view of executable steps (e.g., defined by triggers and actions), so some changes may be hidden from view or the implications of those changes (e.g., from changes to connections or execution where some steps would be skipped or have a different result) may not be evident from the displayed view. Similarly, steps may have one or more layers of configurations, such as where an action is defined, a connection for that action is defined, and login credentials are defined for the connection, and changes may occur at any level whether the level is visible in the outline or not. The technology described herein may improve detectability, viewability, and interactability, among other things for the code difference(s). For example, a step can be added or removed from a workflow, a step can be moved up or down in the workflow, a step can be nested or unnested within a condition, the configuration within a step can be changed, a step can be skipped or unskipped between versions (e.g., a skipped step may indicate that when an executable workflow or recipe is run, the skipped step may be ignored and not executed; unskipping may indicate that the step may be executed when the code is run), or other changes.

These and other changes are specific to the executable nature of software code and the implications of functional changes, especially where code is displayed in a low-code format or outline thereby hiding some changes. As noted above, previous technologies for tracking changes tracked only textual changes and did not indicate the type or functionality of the steps or changes, among many other shortcomings. The technology described herein allows various changes in the functional, executable steps to be detected and intelligently displayed, and changes in a multi-layered configuration to be detected and surfaced (e.g., at higher levels than the changes may be detected), among other operations and benefits.

At 402, the difference engine 140 may determine a first code version including a first plurality of executable steps with one or more triggers and one or more actions triggered by the one or more triggers. For instance, the difference engine 140 may receive the code versions via upload, access them via a database 124 or 138, or may interact with one of the other components of the system 150 described above to access and track/detect changes as code is changed or new versions are saved. In some implementations, the code versions may be defined or illustrated as outlines, software recipes, or workflows, as illustrated in the examples herein (e.g., in reference to FIG. 6).

As noted herein, one or more of the first code version and the second code version may be displayed in a graphical user interface as a low-code software recipe, which includes an outline of executable software code.

At 404, the difference engine 140 may determine a second code version including a second plurality of executable steps and including one or more changes from the first plurality of executable steps. For example, similar to the operation at 402, the difference engine 140 may receive, access, or track changes to code to determine the second version. Although the technology described herein may be used to compare any two versions of code, the second version may represent an updated version of the first version.

At 406, the difference engine 140 may detect one or more changes between the first plurality of executable steps and the second plurality of executable steps. For example, various types of changes may be detected and categorized into types, as described throughout this disclosure. Various graphical elements may be associated with each type of change, such as whether a step is added or moved may be reflected in a patterned and/or colored background or outline and whether a step is moved may be reflected in a defined tag on a graphical representation of a step. As noted elsewhere herein, various types of changes and graphical elements may be possible and used, examples of which are provided herein.

The difference engine 140 may detect changes using one or a plurality of methods. In some implementations, the changes may be determined by tracking individual steps using step identifiers to allow the steps to be identified and matched across versions. In some implementations, the changes may be determined based on language or function of the step, configuration of the step, context of surrounding steps, sequencing of logical connection of steps, or otherwise. In some instances, the difference engine 140 may track changes as they are made in the code.

The difference engine 140 may detect changes based on changes in various fields, configurations, connection definitions (e.g., definitions of login credentials), logical connections with other steps, metadata of steps, sequencing of steps, or other methods.

In some implementations, a difference between versions could be hidden from a default, step, or outline view of a graphical user interface. The difference engine 140 may identify matching steps and then compare fields or routines of the steps, which fields or routines may be filtered to those with a functional effect or otherwise. For example, after determining a matching step between versions, the difference engine 140 may compare configuration layers, connection layers, linking (e.g., whether a step is executed in context of the code or as defined) with other steps, or other layers across the matched steps to detect a difference and, in some instances, the type of the difference. For instance, the difference detection may detect a difference in the configuration of a step between the first code version and the second code version.

In some implementations, the difference engine 140 may determine a difference in execution of the second code version including a skipped step in the second code version that is unskipped in the first code version, for example, where the skipped step includes a trigger or action. In some instances, whether or not the skipped step is skipped may not be visible in the text or graphical depiction of the skipped step in the first and/or second code version, such as where it is based on a configuration change or change in logic of the code. The difference engine 140, as noted elsewhere herein, may detect that the step is skipped and graphically indicate that it is skipped in a tag or otherwise.

In some instances, the difference engine 140 may compare line and configuration changes or connection changes, such as configurations of source or destination files or folders, API(s), URL(s), login credentials, or other definitions.

The difference may also or alternatively be detected in context of the code, so that the difference engine 140 understands how multiple steps interact with one another to cause changes in execution. For instance, in addition to the other methods described, the difference engine 140 may track logical steps and associated details across a workflow to determine how it would be executed in production and detect changes between how the two versions would be executed. In some implementations, the difference engine 140 may execute the code versions in production or in a sandbox, safe, virtual, or limited environment to detect the differences.

As noted above, the difference engine 140 may detect differences including their types, such as a configuration change, a connection change, movement or addition of a step, etc., which types of changes may be displayed in various graphical forms, as noted elsewhere herein.

At 408, the difference engine 140 may generate a graphical user interface including one or more graphical elements indicating the one or more detected changes. For instance, the difference engine 140 may graphically illustrate changes, for example using highlighting, backgrounds, borders, tags, top bars, side bars, arrows, icons, or other graphical elements as illustrated and described in the examples herein.

Figure 8:
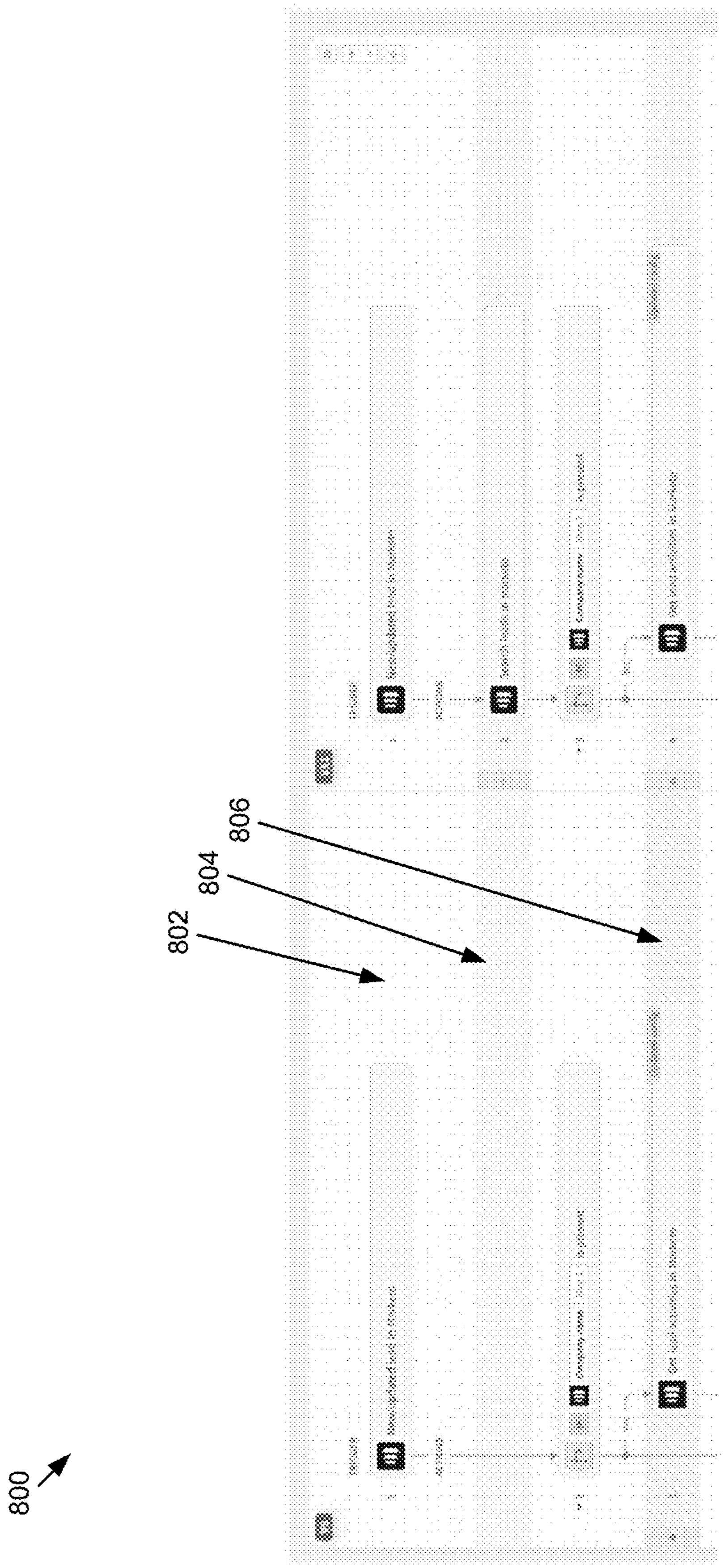
FIG. 8 illustrates an example graphical user interface in which code versions are displayed side-by-side.

For example, FIG. 8 illustrates an example graphical user interface 800 in which a first code version is displayed on the left and a second code version is displayed on the right. As illustrated, matching and unchanged steps may be displayed horizontally aligned as illustrated at 802. An added step is illustrated at 804 in which a space is added to the depiction of the first code version and the added step and space are illustrated across the interface 800 using a background block, which is illustrated in green and includes a first pattern.

A changed but matching step is illustrated at 806 with a blue background, second pattern, and other features to illustrate the changes. For example, as illustrated at 806 the second version of this step is visually unchanged based on its text or otherwise, so the difference engine 140 has generated a background having a defined type to note the type of change as well as tags for the first and/or second version of the step indicating a type of change (e.g., "updated config"). For example, because the changes occurred in the configuration of the step, they may not be visible in the depiction of the step itself; however, the lower-level changes are surfaced at the higher level (e.g., where the steps are illustrated in the outline, as shown in the example of FIG. 8).

In some implementations, steps or other elements may be selected by a user to open a configuration panel, overlay, separate page, or other information respective to that steps configuration and/or the changes to the configuration.

In some implementations, a graphical user interface may include fields defining steps, flowchart arrows adapted based on the configuration of the interface (e.g., based on added or removed changed steps), or tags corresponding to change type overlaid on the field or step, as described in further detail elsewhere herein.

In some implementations, a graphical user interface includes a graphical field summarizing a step of the second plurality of executable steps of the second code version. The one or more graphical elements may graphically indicate the detected change including a graphical tag overlaid on the graphical field. The graphical tag may indicate a change type selected from a set of change types based on a type of the change(s).

In some implementations, multiple changes may be detected respective to a step and the difference engine 140 may generate graphical element(s) graphically indicating the plurality of changes. For instance, where tags are associated with the change type, multiple tags or a multi-part tag may be displayed corresponding to the step or its configuration. For instance, the difference engine 140 may overlay multiple graphical tags over or adjacent to a graphical field indicating the step, where each of the graphical tags indicate a change type.

At 410, the difference engine 140 may provide the graphical user interface and the one or more graphical elements indicating the detected change(s) on a client device, such as the client device 106 using a client application 108 and the web server 120, although other implementations are possible.

Figure 5A:
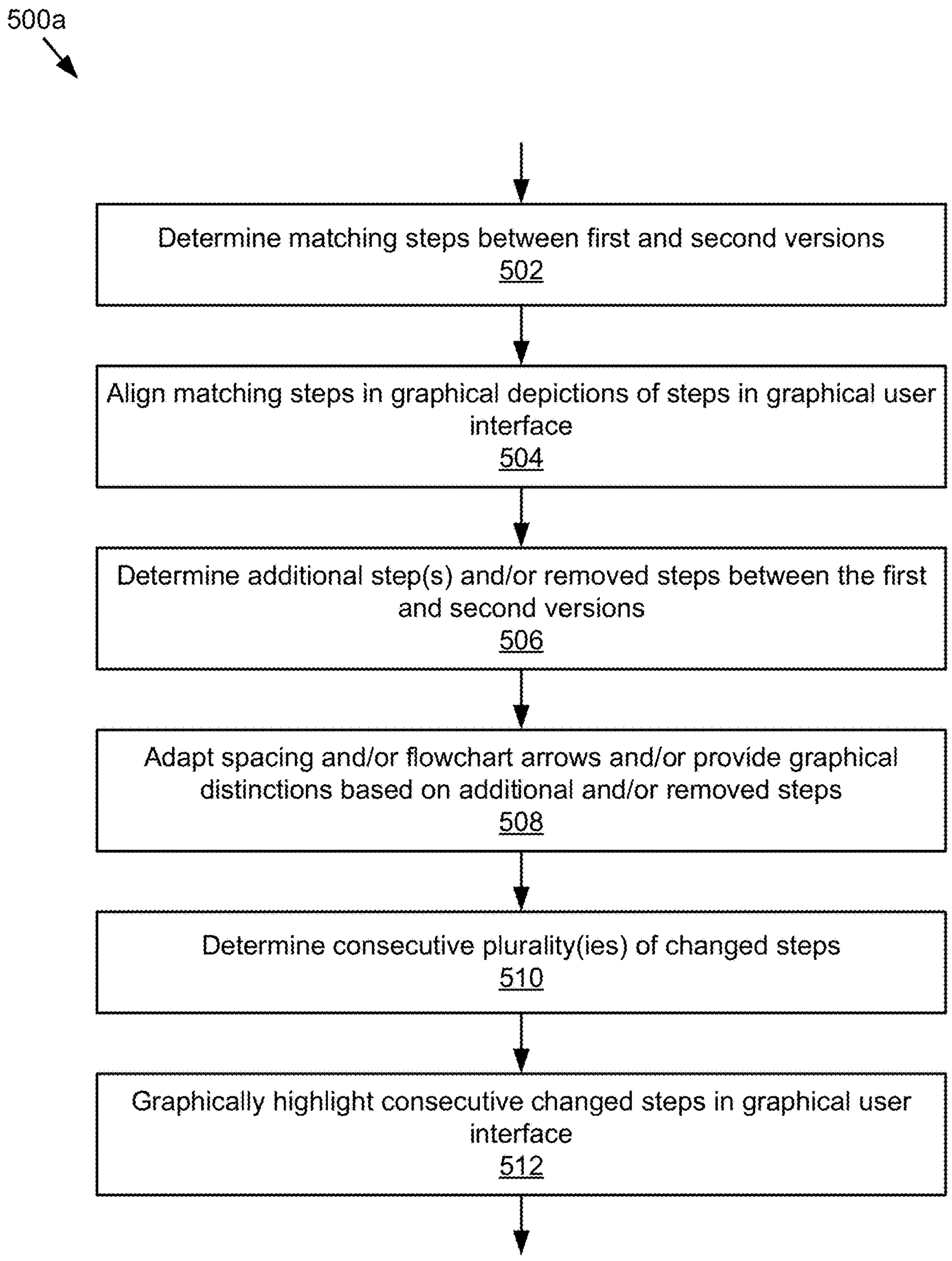
FIGS. 5A and 5B illustrate an example method of an implementation of software recipe difference detection.
Figure 5B:
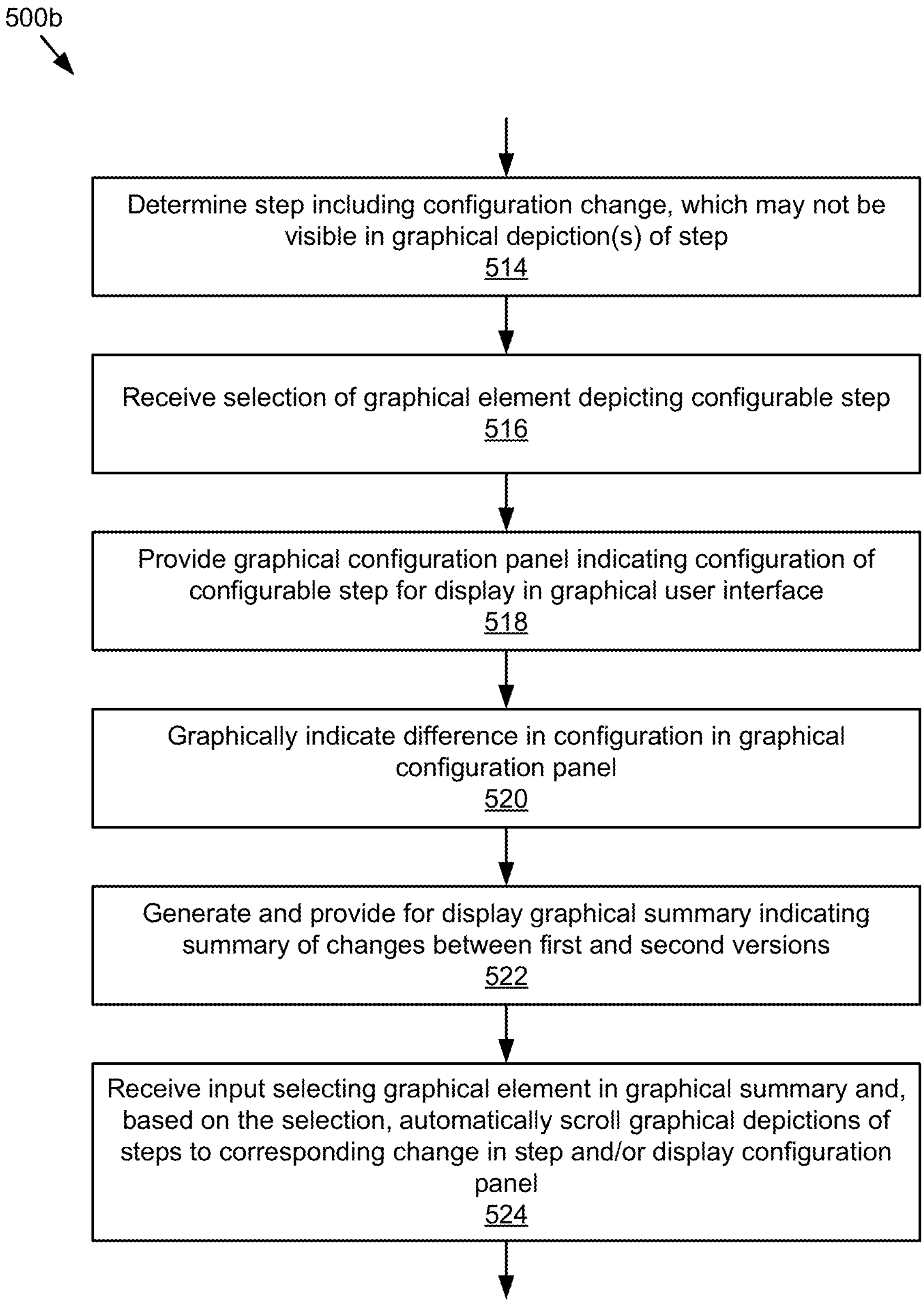

FIGS. 5A and 5B illustrate example methods 500*a* and 500*b* respectively, which may be executed as a single method or multiple methods. The methods 500*a* and 500*b* may provide additional or alternative details to those other methods, operations, features, and technologies described herein, as noted above. Similarly, additional, fewer, or different steps may be used in the same or different order without departing from the scope of this disclosure.

At 502, the difference engine 140 may determine one or more matching steps between the first and second code versions. For instance, as noted above, the difference engine 140 may determine one or a plurality of steps that match between the two code versions being compared or for which changes are tracked. The matched steps may be updated steps, which may be identified by step identifiers or context, as described elsewhere herein.

At 504, the difference engine 140 may align the matching steps in graphical depictions of steps in the graphical user interface. For instance, where a step exists in both of the two versions the difference engine 140 may graphically align graphical elements or depictions of the steps with each other, for example, horizontally in the graphical user interface. As noted below and elsewhere herein, the steps and/or aspects of their configurations, comments, or other elements may be organized into horizontal lines or regions that indicate that steps correspond to one another. The lines, regions, steps, or fields, for example may be modified using various patterns, colors, borders, tags, arrows, or other graphical elements as described herein to indicate modifications between the steps, if any.

At 506, the difference engine 140 may determine one or more additional steps and/or removed steps between the first and second code version. For example, the difference may determine whether a step has been added or removed in its entirety and, at 508, it may adapt spacing and/or flowchart arrows and/or provide graphical distinctions based on additional and/or removed steps.

Where a second code version includes an additional step, the difference engine 140 may display the first code version with additional spacing to allow the other steps of the versions to align. Similarly, where the second code version has had a step removed, the difference engine 140 may insert a space into the series or set of graphical depictions representing steps for the second code.

In some implementations, the difference engine 140 may generate flowchart lines logically and sequentially linking steps using their action type and logical or conditional relationships. The difference engine 140 may display a first flowchart line linking the first plurality of executable steps and a second flowchart line linking the second plurality of executable steps and, where each line and/or arrow is adapted in its length or configuration. For instance, where an additional step is added to or omitted from a code version, the difference engine 140 may elongate a flowchart line to adapt it to the changed spacing or configuration. Similarly, where conditional or logical changes are made, the difference engine 140 may update and/or indicate updated flowchart lines for the configuration.

In some implementations, other graphical distinctions indicating additional, removed, or changed steps may include background colors, patterns, and/or borders around lines or sets of lines of matching, added, or removed steps. For example, as noted in additional detail elsewhere herein, these graphical distinctions may have colors based on the detected change type, patterns based on which version is being identified, and/or borders identifying how blocks of sequentially modified, added, or removed steps.

At 510, the difference engine 140 may determine one or more consecutive pluralities of changed steps. For instance, the difference engine 140 may determine whether a plurality of consecutive steps have received the same modification (e.g., a change, removal, or addition of steps). The difference engine 140 may highlight or border these elements as a block or otherwise extend the background or other graphical distinctions of each line to extend to the plurality of lines thereby drawing additional attention to larger changes.

At 512, the difference engine 140 may graphically highlight the consecutive changed steps in the graphical user interface. For instance, the graphical elements may include a graphical background displayed around the plurality of graphical elements or depictions of steps, for example, where the plurality of changed or similarly changed (modified, added, removed, etc.) steps are consecutively displayed in the series of steps of the code version(s).

At 514, the difference engine 140 may determine a step including a configuration change, which may not be visible in the graphical depiction(s) of the step. For example, where an outline or higher level of the code or software routine/workflow is displayed, the difference engine 140 may determine changes in lower level details, such as configurations of step(s), which may be hidden. For instance, a configurable step of a series of steps may be configurable to define one or more triggers, actions, connections, or other details, as described above. In some instances, the configuration details or changes may be hidden from view in some graphical interfaces.

The difference engine 140 may detect a difference in the configuration of the matched steps. The difference may be displayed as a graphical element, such as highlighted background or tags at the changed configurable step indicating that the configuration has changed in the second code version from the first code version.

In some implementations, the configuration includes a connection definition defining a connection for communicating with a separate software service. For example, the detected change may include a difference in the connection definition between the first code version and the second code version, and the difference engine 140 may display graphical element(s) indicating the difference in the connection definition.

At 516, the difference engine 140 may receive an input selecting the graphical element depicting the configurable step. For example, when a configurable step is selected, the difference engine 140 may display a configuration panel with one or more highlighted portions, tags, or other elements to indicate changes to the configuration for that step. For instance, while by default a high-level workflow outline may be displayed (e.g., as illustrated in the example of FIG. 6), when a step or tag indicating a change to a configuration is selected, the difference engine 140 may open a configuration panel or interface providing additional details.

At 518, the difference engine 140 may provide a graphical configuration panel indicating a configuration of the configurable step for display in the graphical user interface and, at 520, the difference engine 140 may graphically indicate the difference(s) of the configuration in the configuration interface or panel. For instance, using similar elements, such as tags, highlighting, backgrounds, borders, patterns as those described in reference to steps, the changes the configuration may be displayed in the configuration panel.

For example, the code may include a plurality of layers between steps, step types, step configurations, configuration details, connection definitions, etc., as described the example implementations herein. Changes between version may be in any of the layers, such as those describe elsewhere herein, such as nesting or unnesting of steps, movement of a step within a sequence of steps, skipping or unskipping steps, or otherwise.

Figure 9:
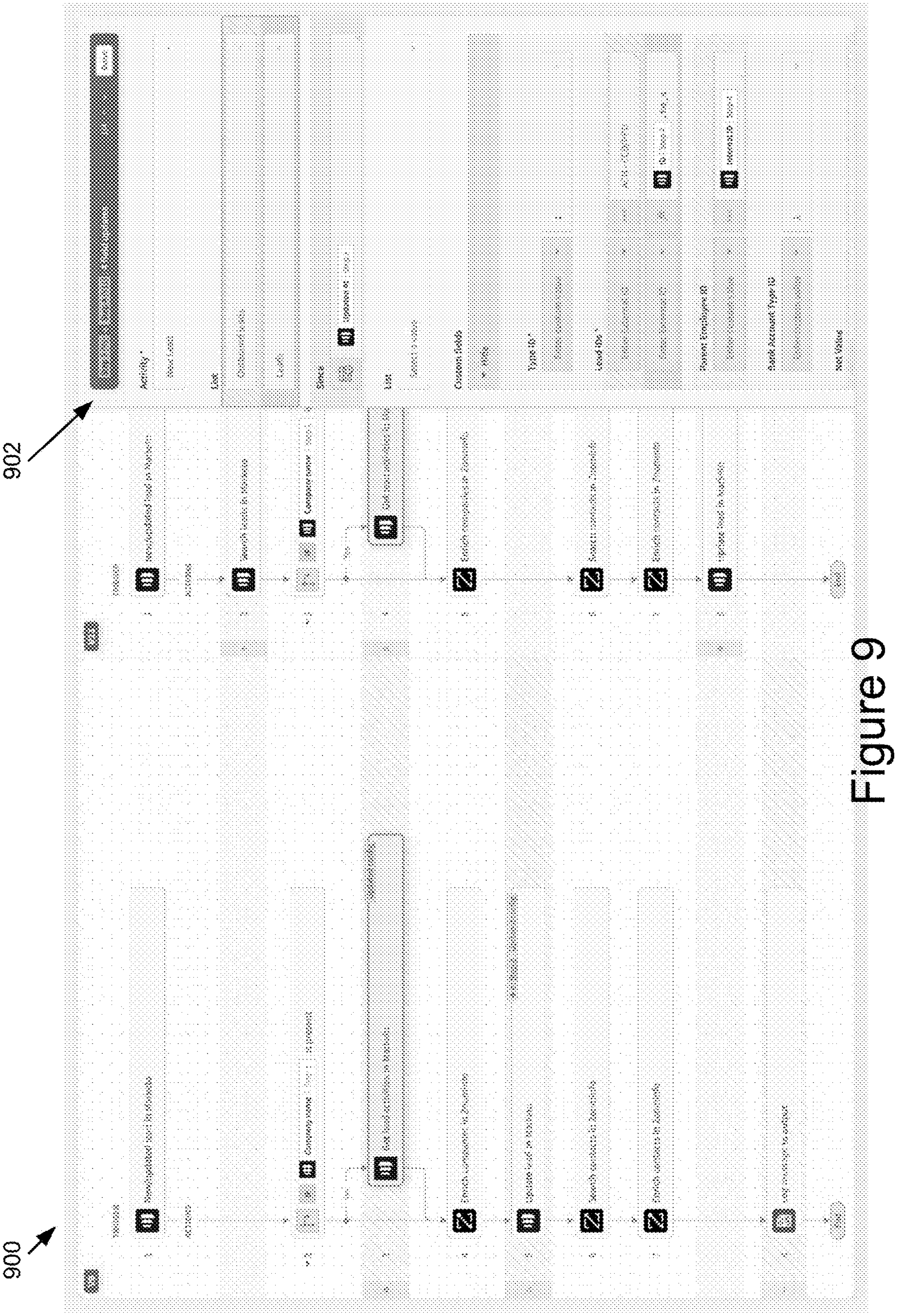
FIG. 9 illustrates an example graphical user interface showing a configuration panel overlayed over graphical depictions of steps of the code versions.

If a user selects a particular step, the difference engine 140 may display an overlay, interface, or panel in which the changes may be illustrated. FIG. 9 illustrates an example graphical user interface 900 showing a configuration panel 902 overlayed over graphical depictions of steps of the code versions. Other implementations, such as where the configuration shifts the interface 900 sideways to make room for the panel, a separate configuration interface is opened (e.g., in a new tab or window, or displayed in place of the interface showing the steps).

For example, as illustrated in the example of FIG. 9, if a user selects a particular step (e.g., with a change indicated in a highlighted background or tag), the difference engine 140 may display a panel 902 showing changes. In the example of FIG. 9, four input fields were changed, which changes are depicted in the colored backgrounds and patterns. For example, as illustrated, a list field was changed from "Outbound leads" to "Leads" (e.g., as illustrated in blue background sections), an input field was added (e.g., as illustrated in the green background section), "Lead ID" was changed from "ACH-CCD/PPD to "[ID|Step 4]" (e.g., as illustrated in blue background sections), and the "Parent Employee ID" field was removed (e.g., as illustrated in the red background section). Accordingly, the difference engine 140 may highlight or otherwise indicate the changes in the configuration panel.

In some implementations, as illustrated in the example of FIG. 9, a single configuration panel 902 may be displayed showing all configurations or solely the different configurations for both code versions. For instance, where an aspect of a configuration of a step is changed, the difference engine 140 may display the previous version and the new version in vertically stacked in the configuration panel. In addition to the colors indicating change types, the difference engine 140 may utilize a pattern to indicate a previous version or current version. It should be noted that the colors, patterns, etc., described herein are provided as examples and that other colors, patterns, or configurations are possible.

At 522, the difference engine 140 may generate and provide for display a graphical summary indicating a summary of changes between the first and second code versions. For example, the one or more graphical elements may be generated to graphically indicate the detected change(s).

In some instances, the graphical elements may include a graphical summary of a plurality of changes between the executable steps of the first and second code versions. The graphical summary may be displayed vertically above the graphical depictions of the steps and/or configuration in the graphical user interfaces. For instance, where the summary of changes is for a configuration panel, it may be displayed as a top bar, as described in reference to FIGS. 16A and 16B. In other instances, where the summary of changes is for a plurality of steps, it may be displayed as an interface, bar, list, etc., such as in the examples of FIGS. 20 and 21.

At 524, the difference engine 140 may receive an input selecting a graphical element in the graphical summary and, based on the selection, automatically scroll the graphical depictions of the steps to a corresponding change in a step and/or may display a configuration panel. For example, as described in reference to FIGS. 20 and 21, based on a selection of an element of a summary, the difference engine 140 may redirect an interface, load or display a configuration panel, or automatically scroll the interface to a changed element that is selected. For instance, for a moved step, a user may select an indication of the move in the summary and the difference engine 140 may cause the interface to automatically scroll to display a location corresponding to the change. In some implementations, the summary may remain at the top of the interface while the configuration panel and/or the graphical configuration of the steps are scrolled or otherwise displayed.

While certain acts and/or functionality described herein as being associated with certain modules, it should be understood that these acts and/or functionality may be performed by other modules, or a combination of two or more modules, and/or moved from a client side or server side implementation without departing from the scope of this disclosure.

Additionally, it should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services. Thus, it should be understood that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the described system(s) may be integrated into to a single computing device or system or additional computing devices or systems, etc. In addition, while the system 100 depicted in FIG. 1 provides an example of an applicable computing architecture, it should be understood that any suitable computing architecture, whether local, distributed, or both, may be utilized in the system 100.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to a computing device and/or other apparatus for performing the operations herein. This computing device may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in executable software, which includes but is not limited to an application, firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Communication unit(s) (e.g., network interfaces, etc.) may also be coupled to the system to enable the data processing system to become coupled to other data processing systems, storage devices, remote printers, etc., through intervening private and/or public networks, such as the network 102.

Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web- Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A computer-implemented method comprising:

determining, by a processor, a first code version including a first outline indicating a first plurality of executable steps at an abstracted detail level and a configuration detail level including first configuration data associated with the first plurality of executable steps, the first plurality of executable steps including one or more triggers and one or more actions triggered by the one or more triggers;

determining, by the processor, a second code version including a second outline indicating a second plurality of executable steps at the abstracted detail level and a second configuration detail level including second configuration data associated with the second plurality of executable steps, the second plurality of executable steps including at least one change from the first plurality of executable steps;

providing, by the processor, a graphical user interface displaying at least one of the first outline and the second outline as a series of steps, the configuration detail level and the second configuration detail level being hidden in the graphical user interface, a configuration of at least one of the one or more triggers and the one or more actions being hidden in the graphical user interface displaying the second code version as the second outline;

detecting, by the processor, the at least one change between the first plurality of executable steps and the second plurality of executable steps including detecting a difference between the first configuration data in the configuration detail level of the first code version and the second configuration data in the second configuration detail level of the second code version of a configurable step present in both the first plurality of executable steps and the second plurality of executable steps; and generating, by the processor, one or more graphical elements including a first graphical element graphically indicating the at least one change at the configurable step at the abstracted detail level, the first graphical element indicating that the configuration at the configuration detail level has changed in the second code version from the first code version.

2. The computer-implemented method of claim 1, wherein:

the second code version is an updated version of the first code version; and one or more of the first code version and the second code version are displayed in the graphical user interface as a low-code software recipe, the low-code software recipe including an outline of executable software code.

3. The computer-implemented method of claim 2, wherein detecting the at least one change includes:

determining, by the processor, a difference in execution of the second code version including a skipped step skipped in the second code version and unskipped in the first code version, at least one of the one or more triggers and the one or more actions including the skipped step.

4. The computer-implemented method of claim 3, wherein:

the at least one change includes the skipped step, wherein that the skipped step is skipped is not visible in text of the skipped step in the second code version; and the one or more graphical elements graphically indicates at the skipped step that it is skipped in the second code version.

5. The computer-implemented method of claim 1, wherein generating the graphical user interface including the one or more graphical elements graphically indicating the at least one change includes:

receiving a selection of the first graphical element at the configurable step;

providing, for display in the graphical user interface, a graphical configuration panel indicating the configuration of the configurable step; and graphically indicating in the graphical configuration panel the difference in the configuration.

6. The computer-implemented method of claim 1, wherein:

the configuration includes a connection definition defining a connection for communicating with a separate software service;

the detected at least one change includes a difference in the connection definition between the first code version and the second code version; and the one or more graphical elements indicate the difference in the connection definition.

7. The computer-implemented method of claim 1, wherein generating the graphical user interface including the one or more graphical elements graphically indicating the at least one change includes:

determining a first step in the first plurality of executable steps that matches a second step in the second plurality of executable steps, the second step being unchanged from the first step;

providing, for display in the graphical user interface, a second graphical element graphically displaying the first step; and providing, for display in the graphical user interface, a third graphical element graphically displaying the second step, the second graphical element being horizontally aligned with the third graphical element in the graphical user interface.

8. The computer-implemented method of claim 7, wherein:

detecting the at least one change includes detecting two or more changed steps between the first plurality of executable steps and the second plurality of executable steps and determining that the two or more changed steps are consecutive;

the method further comprises providing, for display in the graphical user interface, a plurality of third graphical elements graphically displaying the two or more changed steps; and the one or more graphical elements graphically indicating the at least one change includes a graphical background displayed around the plurality of third graphical elements based on the two or more changed steps including a plurality of changed steps that are consecutive.

9. The computer-implemented method of claim 1, wherein:

the second plurality of executable steps include an added step added over the first plurality of executable steps; and generating the graphical user interface includes displaying a first flowchart line linking the first plurality of executable steps and a second flowchart line linking the second plurality of executable steps, the first flowchart line being longer than the second flowchart line.

10. The computer-implemented method of claim 1, wherein:

the graphical user interface includes a graphical field summarizing a step of the second plurality of executable steps; and the one or more graphical elements graphically indicating the at least one change includes a graphical tag overlaid on the graphical field, the graphical tag indicating a change type selected from a set of change types based on a type of the at least one change.

11. The computer-implemented method of claim 10, wherein:

the at least one change includes a plurality of changes respective to the step; and the one or more graphical elements graphically indicating the at least one change includes a plurality of graphical tags overlaid on the graphical field, the plurality of graphical tags indicating a plurality of change types based on associated types of the plurality of changes.

12. The computer-implemented method of claim 1, wherein:

the one or more graphical elements graphically indicating the at least one change includes a graphical summary of a plurality of changes between the first plurality of executable steps and the second plurality of executable steps, the plurality of changes including the at least one change, the graphical summary of the plurality of changes being displayed higher in the graphical user interface than graphical representations of the second plurality of executable steps; and the method further comprises:

receiving, by the processor, an input selecting the at least one change from the graphical summary; and based on the input, automatically scrolling the graphical user interface to a location corresponding to the at least one change selected from the graphical summary.

13. A system comprising:

one or more processors; and a computer-accessible memory storing instructions that, when executed by the one or more processors, cause the system to:

determine a first code version including a first outline indicating a first plurality of executable steps at an abstracted detail level and a configuration detail level including first configuration data associated with the first plurality of executable steps, the first plurality of executable steps including one or more triggers and one or more actions triggered by the one or more triggers;

determine a second code version including a second outline indicating a second plurality of executable steps, the second plurality of executable steps at the abstracted detail level and a second configuration detail level including second configuration data associated with the second plurality of executable steps, the second plurality of executable steps including at least one change from the first plurality of executable steps;

provide a graphical user interface displaying at least one of the first outline and the second outline as a series of steps, the configuration detail level and the second configuration detail level being hidden in the graphical user interface, a configuration of at least one of the one or more triggers and the one or more actions being hidden in the graphical user interface displaying the second code version as the second outline;

detect the at least one change between the first plurality of executable steps and the second plurality of executable steps including detecting a difference between the first configuration data in the configuration detail level of the first code version and the second configuration data in the second configuration detail level of the second code version of a configurable step present in both the first plurality of executable steps and the second plurality of executable steps; and generate one or more graphical elements including a first graphical element graphically indicating the at least one change at the configurable step at the abstracted detail level, the first graphical element indicating that the configuration at the configuration detail level has changed in the second code version from the first code version.

14. The system of claim 13, wherein:

the second code version is an updated version of the first code version; and one or more of the first code version and the second code version are displayed in the graphical user interface as a low-code software recipe, the low-code software recipe including an outline of executable software code.

15. The system of claim 14, wherein detecting the at least one change includes:

determining a difference in execution of the second code version including a skipped step skipped in the second code version and unskipped in the first code version, at least one of the one or more triggers and the one or more actions including the skipped step.

16. The system of claim 15, wherein:

the at least one change includes the skipped step, wherein that the skipped step is skipped is not visible in text of the skipped step in the second code version; and the one or more graphical elements graphically indicates at the skipped step that it is skipped in the second code version.

17. The system of claim 7, wherein generating the graphical user interface including the one or more graphical elements graphically indicating the at least one change includes:

receiving a selection of the first graphical element at the configurable step;

providing, for display in the graphical user interface, a graphical configuration panel indicating the configuration of the configurable step; and graphically indicating, in the graphical configuration panel, the difference in the configuration.

18. The system of claim 7, wherein:

the configuration includes a connection definition defining a connection for communicating with a separate software service;

the detected at least one change includes a difference in the connection definition between the first code version and the second code version; and the one or more graphical elements indicate the difference in the connection definition.

* * * * *